(12) United States Patent
Ohsawa et al.

(10) Patent No.: US 8,493,528 B2
(45) Date of Patent: Jul. 23, 2013

(54) LIQUID CRYSTAL DISPLAY DEVICE

(75) Inventors: Kazuhiko Ohsawa, Hachioji (JP);
Tetsushi Yoshida, Tsukui-gun (JP)

(73) Assignee: Casio Computer Co., Ltd., Tokyo (JP)

( * ) Notice: Subject to any disclaimer, the term of this patent is extended or adjusted under 35 U.S.C. 154(b) by 203 days.

(21) Appl. No.: 13/182,272

(22) Filed: Jul. 13, 2011

(65) Prior Publication Data

US 2011/0267565 A1 Nov. 3, 2011

Related U.S. Application Data

(63) Continuation of application No. 12/408,220, filed on Mar. 20, 2009, now Pat. No. 7,999,894, which is a continuation of application No. 11/804,950, filed on May 21, 2007, now Pat. No. 7,532,288.

(30) Foreign Application Priority Data

Jan. 26, 2007 (JP) .................................. 2007-016655

(51) Int. Cl.
*G02F 1/1335* (2006.01)
*G02F 1/1347* (2006.01)

(52) U.S. Cl.
USPC .............................. 349/96; 349/75; 349/117

(58) Field of Classification Search
USPC ............... 349/75, 94, 96, 117, 119, 122, 123, 349/128
See application file for complete search history.

(56) References Cited

U.S. PATENT DOCUMENTS

| 7,403,248 | B2 | 7/2008 | Uchida et al. | |
|---|---|---|---|---|
| 8,049,850 | B2 * | 11/2011 | Sugiyama et al. | 349/118 |
| 2007/0200986 | A1 | 8/2007 | Ong | |
| 2009/0122243 | A1 | 5/2009 | Sugiyama et al. | |

FOREIGN PATENT DOCUMENTS

| JP | 2003-262869 A | 9/2003 |
|---|---|---|
| JP | 2006-285220 A | 10/2006 |
| TW | 200400387 A | 1/2004 |
| TW | 200643570 A | 12/2006 |

OTHER PUBLICATIONS

Taiwanese Office Action dated Apr. 30, 2012 (and English translation thereof) in counterpart Taiwanese Application No. 096118741.

* cited by examiner

*Primary Examiner* — Kevin S Wood
(74) *Attorney, Agent, or Firm* — Holtz, Holtz, Goodman & Chick, PC

(57) ABSTRACT

A liquid crystal display device includes a liquid crystal cell including a liquid crystal layer twist-aligned at 90° sandwiched between a pair of substrates, first and second polarizing layers arranged to sandwich the liquid crystal cell therebetween so that their absorption axes set to parallel with directions crossing aligning treatment directions of the substrates at 45°, and viewing angle compensating plates respectively arranged between the polarizing layers and the liquid crystal cell. A total value of retardations in a thickness direction, defined as a value of a product of a phase difference within a plane perpendicular to substrate surfaces of the liquid crystal cell and a layer thickness, of optical layers present between the polarizing layers is set to a value that substantially cancels out a retardation in a liquid crystal layer thickness direction when a saturation voltage is applied to the liquid crystal layer.

24 Claims, 24 Drawing Sheets

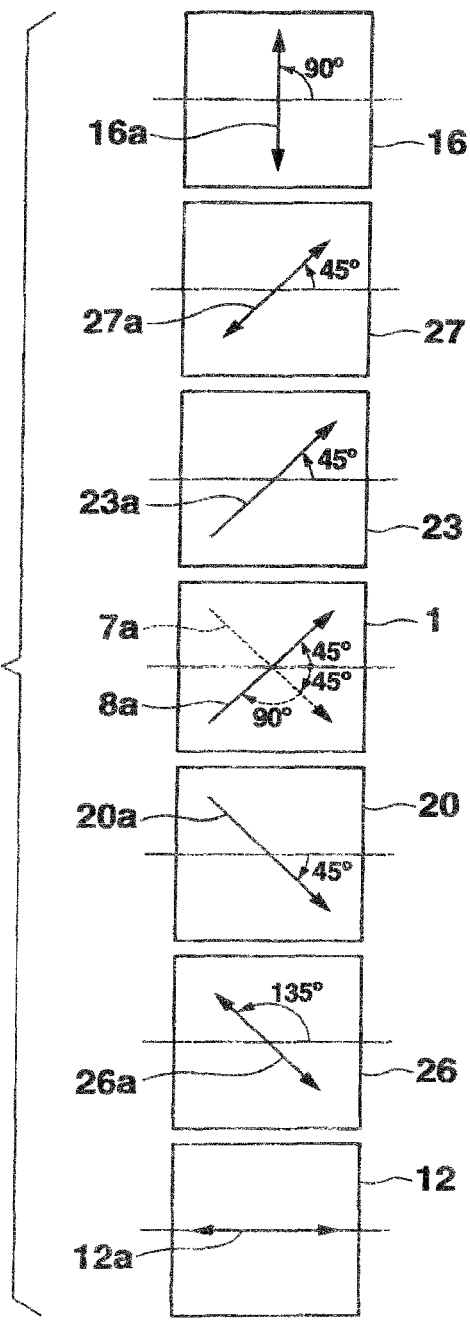

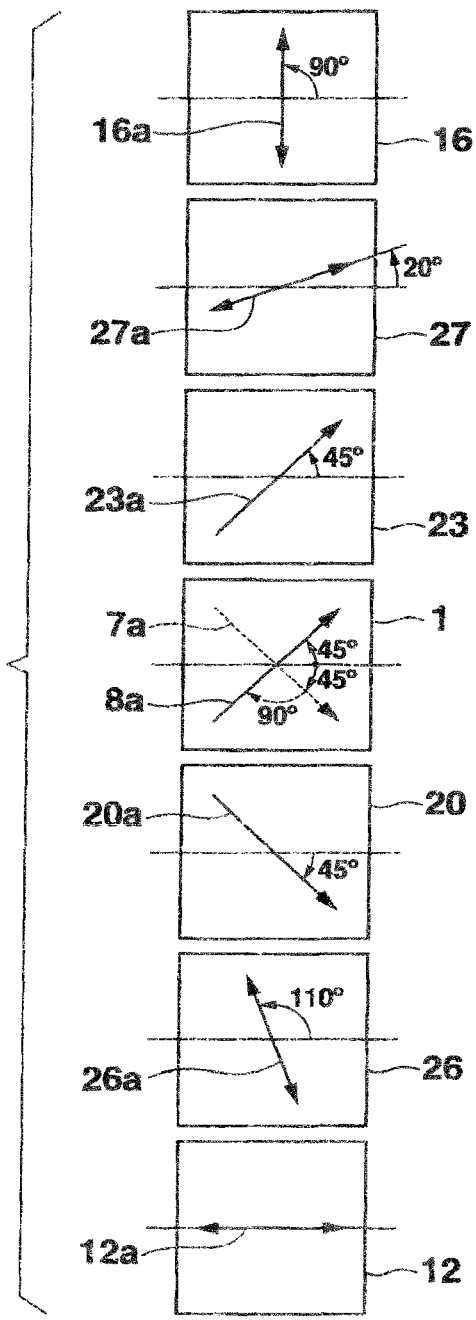

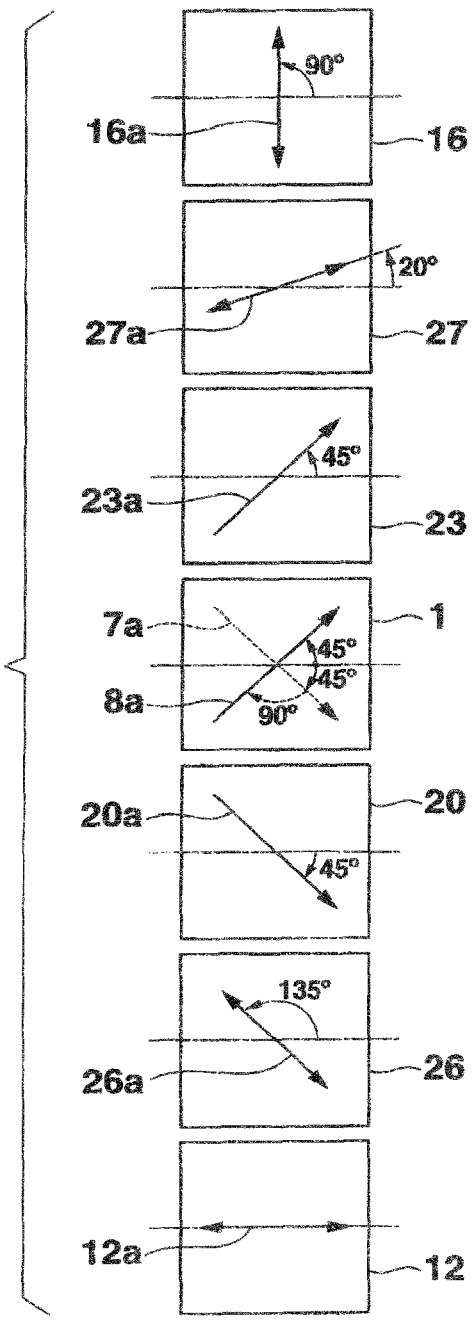

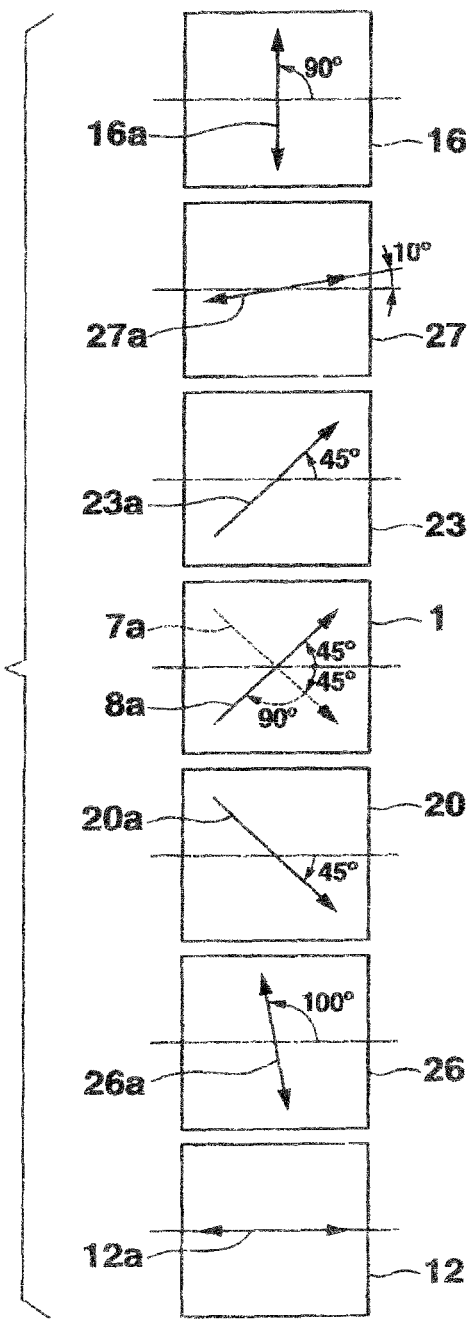

LIQUID CRYSTAL DISPLAY DEVICE

CROSS-REFERENCE TO RELATED APPLICATIONS

The present application is a Continuation Application of U.S. application Ser. No. 12/408,220 filed Mar. 20, 2009, now U.S. Pat. No. 7,999,894 which is a Continuation Application of U.S. application Ser. No. 11/804,950 filed May 21, 2007 (now U.S. Pat. No. 7,532,288 issued May 12, 2009), which is based upon and claims the benefit of priority from prior Japanese Patent Application No. 2007-016655, filed Jan. 26, 2007, the entire contents of all of which are incorporated herein by reference.

BACKGROUND OF THE INVENTION

1. Field of the Invention

The present invention relates to a TN (twisted nematic) type liquid crystal display device.

2. Description of the Related Art

As a TN type liquid crystal display device, there is known a liquid crystal display device that includes a liquid crystal cell including a liquid crystal layer in which liquid crystal molecules are twist-aligned at a twisted angle of substantially 90° between a pair of substrates, and a pair of polarizing plates arranged to sandwich this liquid crystal cell therebetween, wherein one of the pair of polarizing plates is arranged in such a direction that an absorption axis sets to parallel with a direction crossing an aligning treatment direction of one substrate of the liquid crystal cell at 45° (see JP-A 2006-285220 (KOKAI)).

This liquid crystal display device enhances contrast and improves grayscale inversion in an intermediate gradation. Further, in this liquid crystal display device, viewing angle compensating plates are respectively arranged between the liquid crystal cell and the pair of polarizing plates, and arranging a retardation plate improves viewing angle characteristics.

However, the TN type liquid crystal display device does not sufficiently compensate viewing angle dependency of a transmittance, and hence sufficiently wide viewing angle characteristics does not be obtained.

BRIEF SUMMARY OF THE INVENTION

According to a first aspect of the present invention, there is provided a liquid crystal display device comprising:

a liquid crystal cell including a pair of substrates in which at least one electrode and an alignment film that covers the electrode are provided on each of inner surfaces of the substrates facing each other, and a liquid crystal layer that is sandwiched between the substrates and includes liquid crystal molecules twist-aligned at substantially 90°;

first and second polarizing plates that are arranged on both sides of the liquid crystal cell, each of the polarizing plates including a polarizing layer having a transmission axis allowing transmission of linear polarized light and an absorption axis in a direction perpendicular to the transmission axis, and at least one base film that supports the polarizing layer; and first and second viewing angle compensating layers that are respectively arranged between the liquid crystal cell and the first and second polarizing plates, each of the viewing angle compensating layers having a phase difference within a plane parallel to substrate surfaces of the liquid crystal cell and a phase difference within a plane perpendicular to the substrate surfaces, wherein a total value of retardations in a thickness direction, each of which is a product of a phase difference within a plane perpendicular to the substrate surfaces and a layer thickness, of a plurality of optical layers between the first and second polarizing layers, including at least the first and second viewing angle compensating layers but excluding the liquid crystal layer, is set to a value that cancels out a retardation in a liquid crystal layer thickness direction, which is a product of a phase difference within a plane perpendicular to the substrate surfaces and a liquid crystal layer thickness, of the liquid crystal layer when a voltage sufficiently high to raise and align the liquid crystal molecules with respect to the substrate surfaces is applied to the liquid crystal layer between the electrodes of the first and second substrates.

Furthermore, according to a second aspect of the present invention, there is provided a liquid crystal display device comprising:

a first substrate in which at least one electrode and a first alignment film that covers the first electrode and is subjected to an aligning treatment in a predetermined first direction are provided on one surface thereof;

a second substrate that is arranged to face an electrode formation surface of the first electrode, and in which at least one second electrode facing the first electrode and a second alignment film that covers the second electrode and is subjected to an aligning treatment in a second direction crossing the first direction at an angle of substantially 90° are provided on a surface facing the first substrate;

a liquid crystal layer that is sandwiched between the first alignment film of the first substrate and the second alignment film of the second substrate and includes liquid crystal molecules twist-aligned between the first alignment film and the second alignment film at a twisted angle of substantially 90°;

a first polarizing plate that includes a first polarizing layer that is arranged to face an outer surface opposite to an electrode formation surface of the first substrate and has an absorption axis in a direction crossing an aligning treatment direction of the first alignment film at an angle of substantially 45°, and a base film formed of a resin film that is provided on a surface of the first polarizing layer facing at least the first substrate and has a retardation in a thickness direction, which is a product of a phase difference within a plane perpendicular to substrate surfaces of the first and second substrates and a layer thickness;

a second polarizing plate that includes a second polarizing layer that is arranged to face an outer surface opposite to an electrode formation surface of the second substrate and has an absorption axis in a direction substantially perpendicular to or substantially parallel to the absorption axis of the first polarizing layer, and a base film formed of a resin film that is provided on a surface of the second polarizing layer facing at least the second substrate and has a retardation in the thickness direction, which is a product of a phase difference within a plane perpendicular to the substrate surfaces and a layer thickness; and first and second viewing angle compensating plates that are respectively arranged between the first substrate and the first polarizing plate and between the second substrate and the second polarizing plate, each viewing angle compensating plate including a viewing angle compensating layer having a phase difference within a plane parallel to the substrate surfaces and a phase difference within a plane perpendicular to the substrate surfaces, and a base film formed of a resin film that is provided on at least one surface of the viewing angle compensating layer and has a retardation in the thickness direction, which is a product of a phase difference within a plane perpendicular to the substrate surfaces and a layer thickness, wherein a total value of the retardation values in the thickness direction, each of which is a product of a phase difference within a plane perpendicular to the substrate surfaces and a layer thickness, of a plurality of optical layers between the first polarizing layer of the first polarizing plate and the second polarizing layer of the second polarizing plate, including at least the base films on the surfaces of the first and second polarizing plates facing the first and second substrates, the respective viewing angle compensating layers of the first and second viewing angle compensating plates, and the base films of the first and second viewing angle compensating plates but excluding the liquid crystal layer, and a retardation value in the liquid crystal layer thickness direction, which is a product of a phase difference within a plate perpendicular to the substrate surfaces and a liquid crystal layer thickness, of the liquid crystal layer when a voltage sufficiently high to raise and align the liquid crystal molecules with respect to the substrate surfaces is applied to the liquid crystal layer between the electrodes of the first and second substrates is set to the range of −80 nm to +80 nm.

Moreover, according to a third aspect of the present invention, there is provided a liquid crystal display device comprising:

a first substrate in which at least one electrode and a first alignment film that covers the first electrode and is subjected to an aligning treatment in a predetermined first direction are provided on one surface thereof;

a second substrate that is arranged to face an electrode formation surface of the first substrate, and in which at least one second electrode that faces the first electrode and a second alignment film that covers the second electrode and is subjected to an aligning treatment in a second direction crossing the first direction at an angle of substantially 90° are provided on a surface facing the first substrate;

a liquid crystal layer that is sandwiched between the first alignment film of the first substrate and the second alignment film of the second substrate and includes liquid crystal molecules twist-aligned between the first alignment film and the second alignment film at a twisted angle of substantially 90°;

a first polarizing layer that is arranged to face an outer surface opposite to the electrode formation surface of the first substrate and has an absorption axis in a direction crossing an aligning treatment direction of the first alignment film at an angle of substantially 45°;

a second polarizing layer that is arranged to face an outer surface opposite to an electrode formation surface of the second substrate and has an absorption axis in a direction substantially perpendicular to or substantially parallel to the absorption axis of the first polarizing layer; and first and second viewing angle compensating layers that are respectively arranged between the first substrate and the first polarizing layer and between the second substrate and the second polarizing layer, each viewing angle compensating layer having a phase difference within a plane parallel to substrate surfaces of the first and second substrates and a phase difference within a plane perpendicular to the substrate surfaces, wherein, in regard to a plurality of optical layers between the first and second polarizing layers including at least the first and second viewing angle compensating layers but excluding the liquid crystal layer, a retardation Rth in a thickness direction is set to the range satisfying the following expression:

$$-80 \text{ nm} < Rth - 0.83 \Delta nd < 80 \text{ nm}$$

where one and the other of two directions perpendicular to each other within a plane parallel to the substrate surfaces are an X axis and a Y axis, a thickness direction perpendicular to the substrate surfaces is a Z axis, nx is a refractive index in the X axis direction, ny is a refractive index in the Y axis direction, nz is a refractive index in the Z axis direction, d is a layer thickness of the optical layer, Rthi is a retardation in the thickness direction of each optical layer represented as $\{(nx+ny)/2-nz\} \cdot d$, Rth is the retardation in the thickness direction obtained by adding values of the retardations Rthi in the thickness direction of the respective optical layers, and $\Delta nd$ is a product of an anisotropic refractive index $\Delta n$ of a liquid crystal material constituting the liquid crystal layer and a liquid crystal thickness d.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 11 is a view showing aligning treatment directions of first and second alignment films, directions of absorption axes of first and second polarizing layers, directions of optical axes of first and second viewing angle compensating layers, and directions of retardation axes of first and second retardation plates in the liquid crystal display device according to the second embodiment;

FIG. 21 is a view showing aligning treatment directions of first and second alignment films, directions of absorption axes of first and second polarizing layers, directions of optical axes of first and second viewing angle compensating layers, and directions of retardation axes of first and second retardation plates in the liquid crystal display device according to the fifth embodiment;

FIG. 24 is a view showing aligning treatment directions of first and second alignment films, directions of absorption axes of first and second polarizing layers, directions of optical axes of first and second viewing angle compensating layers, and directions of retardation axes of first and second retardation plates in the liquid crystal display device according to the sixth embodiment;

FIG. 27 is a view showing aligning treatment directions of first and second alignment films, directions of absorption axes of first and second polarizing layers, directions of optical axes of first and second viewing angle compensating layers, and directions of retardation axes of first and second retardation plates in the liquid crystal display device according to the seventh embodiment.

DETAILED DESCRIPTION OF THE INVENTION (First Embodiment)

Figure 1:
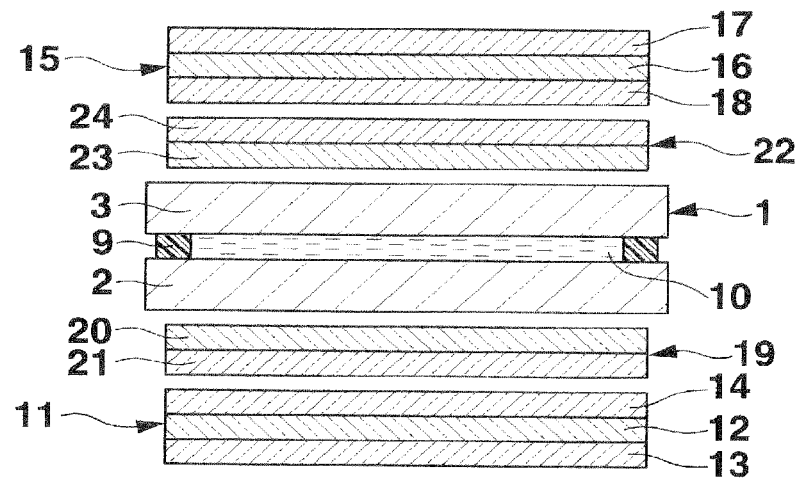
FIG. 1 is a schematic cross-sectional view of a liquid crystal display device showing a first embodiment of the present invention.

FIGS. 1 to 8 show a first embodiment according to the present invention, and FIG. 1 is a schematic cross-sectional view of a liquid crystal display device.

This liquid crystal display device is a TN type liquid crystal display device including a liquid crystal cell 1 including a nematic liquid crystal layer 10 in which liquid crystal molecules are twist-aligned at a twisted angle of substantially 90° sandwiched between a pair of transparent substrates 2 and 3, a pair of first and second polarizing plates 11 and 15 arranged to sandwich this liquid crystal cell 1, and first and second viewing angle compensating plates 19 and 22 respectively arranged between the liquid crystal cell 1 and the pair of polarizing plates 11 and 15.

Figure 2:
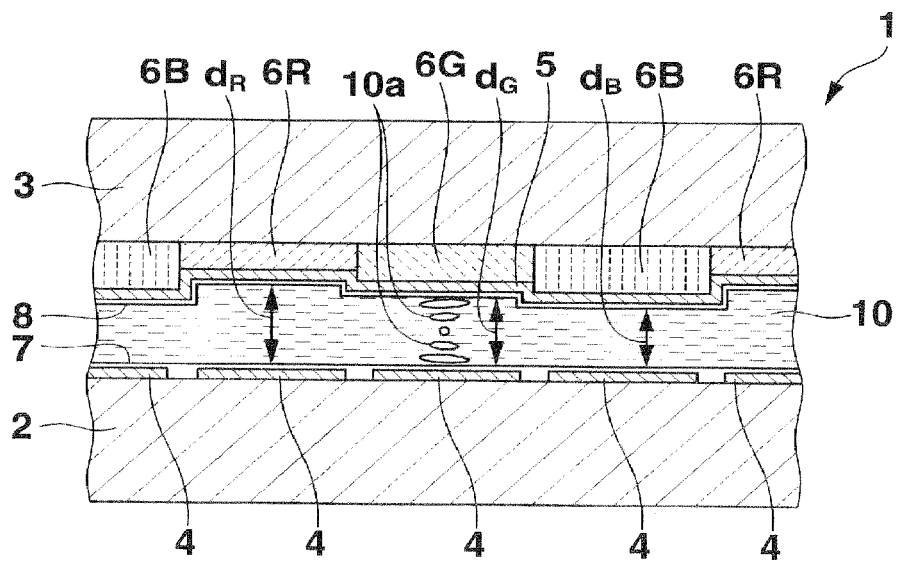
FIG. 2 is an enlarged cross-sectional view of a part of a liquid crystal cell.

FIG. 2 is an enlarged cross-sectional view of a part of the liquid crystal cell 1. This liquid crystal cell 1 includes a first substrate 2, a second substrate 3 arranged to face this first substrate, and a liquid crystal layer 10 arranged between the first and second substrates. The first substrate 2 has at least one first transparent electrode 4 and a first alignment film 7 that covers the first electrode 4 and is subjected to aligning treatment in a predetermined first direction, the first transparent electrode 4 and the first alignment film 7 being provided on one surface thereof. The second substrate 3 is arranged to face an electrode formation surface of the first substrate 2, and has at least one second transparent electrode 5 facing the first electrode 4, and a second alignment film 8 that covers the second transparent electrode 5 and is subjected to an aligning treatment in a second direction crossing the first direction for covering the second electrode 5 at an angle of substantially 90°, the second transparent electrode 5 and the second alignment film 8 being provided on a surface facing the first substrate 2. The liquid crystal layer 10 is sandwiched between the first alignment film 7 and the second alignment film 8, and liquid crystal molecules 10*a* are twist-aligned at a twisted angle of substantially 90° between the first alignment film 7 and the second alignment film 8. This liquid crystal layer 10 optically rotates a polarized light that has entered in an initial alignment state of liquid crystal molecules 10*a* at 90°. Moreover, this liquid crystal layer 10 apparently changes a value of a retardation produced with respect to transmitted light within the range of substantially λ/2 in accordance with an alignment state of the liquid crystal molecules 10*a*.

This liquid crystal cell 1 is an active matrix liquid crystal cell, and the electrode 4 provided on the substrate (which will be referred to as a rear substrate hereinafter) 2, located on an opposite side of a display observation side, is formed of a plurality of pixel electrodes aligned and formed in a matrix shape along a row direction (a lateral direction of a screen) and a column direction (the lateral direction of the screen). The electrode 5 provided on the other substrate (which will be referred to as a front substrate hereinafter) 3, located on the observation side, is a single-film-like opposed electrode formed to face an entire arrangement region of the plurality of pixel electrodes 4.

Although omitted in FIG. 2, a plurality of TFTs (thin film transistors) respectively arranged in accordance with the plurality of pixel electrodes 4, a plurality of scanning lines through which gate signals are supplied to the plurality of TFTs in respective rows, and a plurality of signal lines through which data signals are supplied to the plurality of TFTs in respective columns are provided on a surface of the rear substrate 2 facing the front substrate 3.

The TFT includes a gate electrode formed on the rear substrate 2, a gate insulating film formed to cover the gate electrode, an i-type semiconductor film formed on the gate insulating film to face the gate electrode, and a drain electrode and a source electrode formed on both side portions of the i-type semiconductor film through an n-type semiconductor film. The gate electrode is connected with the scanning line, the drain electrode is connected with the signal line, and the source electrode is connected with the corresponding pixel electrode 4.

Additionally, color filters 6R, 6G, and 6B of three colors, i.e., red, green, and blue are provided on a surface of the front substrate 3 facing the rear substrate 2 in accordance with a plurality of pixels formed of regions where the plurality of pixel electrodes 4 face the opposed electrode 5, and the opposed electrode 5 is provided to cover the color filters 6R, 6G, and 6B.

Further, the pair of substrates 2 and 3 are arranged to face each other with a predetermined gap provided therebetween, and bonded to each other through a sealing member 9 (see FIG. 1) formed into a frame shape surrounding an arrangement region of the plurality of pixel electrodes 4. The liquid crystal layer 10 is encapsulated in a region between the pair of substrates 2 and 3 surrounded by the sealing member 9.

Furthermore, as to the color filters 6R, 6G, and 6B of three colors, i.e., red, green, and blue, the green filter 6G is formed to be thicker than the red filter 6R and the blue filter 6B is formed with a larger film thickness than that of the green filter 6G, so that a liquid crystal layer thickness $d_R$ of one of the pixels to which the red filter 6R is provided, a liquid crystal layer thickness $d_G$ of one of the pixels to which the green filter 6G is provided, and a liquid crystal layer thickness $d_B$ of one of the pixels to which the blue filter 6B is provided have a relationship of $d_R > d_G > d_B$.

A ratio of the liquid crystal layer thickness $d_R$ of the pixel to which the red filter 6R is provided, the liquid crystal layer thickness $d_G$ of the pixel to which the green filter 6G is provided, and the liquid crystal layer thickness $d_B$ of the pixel to which the blue filter 6B is provided is set to $d_R:d_G:d_B=1.1:1.0:0.9$.

Moreover, of the pair of polarizing plates arranged to sandwich the liquid crystal cell 1 therebetween, the first polarizing plate 11 arranged to face an outer surface of the liquid crystal cell 1 opposite to the electrode formation surface of the rear substrate 2 is arranged so that its absorption axes sets to parallel with a direction crossing an aligning treatment direction of the first alignment film 7 formed on the rear substrate 2 at an angle of substantially 45°. The second polarizing plate 15 arranged to face an outer surface of the liquid crystal cell 1 opposite to the electrode formation surface of the substrate 3 is arranged so that its absorption axes sets to parallel with a direction crossing the aligning treatment direction of the second alignment film 8 formed on the front substrate 3 at an angle of substantially 45°. That is, the absorption axes of the first polarizing plate 11 and the second polarizing plate 15 are perpendicular to each other.

The first polarizing plate 11 includes a first polarizing layer 12 having an absorption axes in a direction crossing the aligning treatment direction of the first alignment film 7 at an angle of substantially 45°, and a pair of base films 13 and 14 that are respectively formed on both surfaces of the first polarizing layer 12 to sandwich the first polarizing layer 12 therebetween, have a phase difference in a plane parallel to substrate surfaces of the pair of substrates 2 and 3 being substantially zero, have a phase difference in a plane perpendicular to the substrate surfaces of the pair of substrates 2 and 3 (which will be referred to as a phase difference in a thickness direction thereinafter), and are formed of a transparent resin film, e.g., a TAC (triacetylcellulose) film. The second polarizing plate 15 includes a second polarizing layer 16 having an absorption axis in a direction crossing the aligning treatment direction of the second alignment film 8 formed on the front substrate 8 at an angle of substantially 45°, and a pair of base films 17 and 18 that are provided on both surfaces of the second polarizing layer 16 to sandwich this second polarizing layer 16 therebetween, have a phase difference in a plane parallel to the substrate surfaces being substantially zero, have a phase difference in a plane perpendicular to the substrates (a phase difference in the thickness direction), and are formed of a transparent resin film, e.g., a TAC film.

The first and second viewing angle compensating plates 19 and 22, which are respectively arranged between the liquid crystal cell 1 and the pair of polarizing plates 11 and 15, respectively include viewing angle compensating layers 20 and 23 formed of a discotic liquid crystal layer in which discotic liquid crystal molecules are hybrid-aligned, and a pair of base films 21 and 24 that are formed of a transparent resin film, e.g., the TAC film, the base films 21 being provided on at least one surface of the viewing angle compensating layers 20 and the base films 24 being provided on at least one surface of the viewing angle compensating layers 23. Each of the viewing angle compensating layers 20 and 23 has a phase difference in a plane parallel with the substrate surfaces and a phase difference in a plane perpendicular to the substrate surfaces (a phase difference in the thickness direction). Furthermore, each of the pair of base films 21 and 24 has a phase difference in a plane parallel with the substrate surfaces being substantially zero and a phase difference in a plane perpendicular to the substrate surfaces (a phase difference in the thickness direction).

The first and second viewing angle compensating plates 19 and 22 used in this embodiment are obtained by providing the base film 21 and 24 on one surface of the viewing angle compensating layer 20 and 23, respectively.

Figure 3:
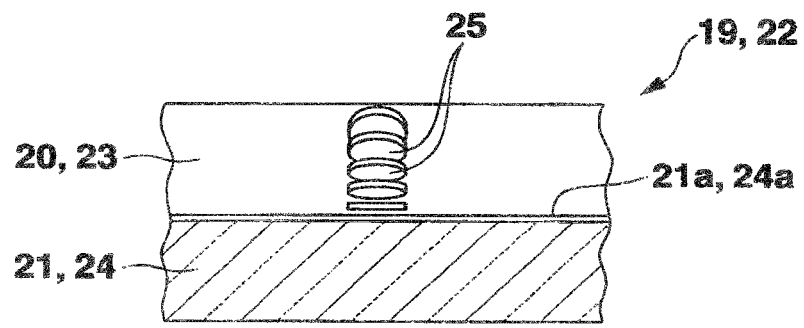
FIG. 3 is an enlarged cross-sectional view of a part of a viewing angle compensating plate.

FIG. 3 is an enlarged cross-sectional view of a part of the first and second viewing angle compensating plates 19 and 22, and the base films 21 and 24 are respectively provided with alignment films 21*a* and 24*a* that are subjected to an aligning treatment in one direction, the alignment film 21*a* being formed on one surface of the base film 21 and the alignment film 24*a* being formed on one surface of the base film 24, and the discotic liquid crystal layers are respectively provided on the alignment films 21*a* and 24*a*. In this discotic liquid crystal layer, the discotic liquid crystal molecules 25 are hybrid-aligned so that a molecular axis perpendicular to discotic surfaces of the discotic liquid crystal molecules 25 is placed on a plane perpendicular to a film surface of the base film 21 and parallel to the aligning treatment direction of the alignment film 21*a* and a tilt angle with respect to the base film 21 is sequentially increased from the base film 21 side toward its opposite side.

Each of the viewing angle compensating layer 20 and 23 of the first and second viewing angle compensating plate 19 and 22 has a negative optical anisotropy having an optical axis providing a minimum refractive index in an average tilt direction of the molecular axis in the plane where the molecular axes of the hybrid-aligned discotic liquid crystal molecules 25 are present. Here, a line on which the plane where the molecular axes of the discotic liquid crystal molecules 25 are present crosses the surface of the viewing angle compensating layer 20 and 23 is referred to as an optical axis direction.

Furthermore, the first viewing angle compensating plate 19 is arranged so that a surface of the first viewing angle compensating layer 20 of this viewing angle compensating plate 19 where a tilt angle of the discotic liquid crystal molecules 25 is large (a surface opposite to the base film 21 side) faces the outer surface of the rear substrate 2 of the liquid crystal cell 1. Moreover, the optical axis direction of the first viewing angle compensating layer 20 sets to parallel with a direction substantially parallel to or substantially perpendicular to the aligning treatment direction of the first alignment film 7 formed on the rear substrate 2. The second viewing angle compensating plate 22 is arranged so that a surface of the second viewing angle compensating layer 23 of this viewing angle compensating plate 22 where a tilt angle of the discotic liquid crystal molecules is large (a surface opposite to the base film 24 side) faces the outer surface of the front substrate 3 of the liquid crystal cell 1. Additionally, the optical axis direction of the second viewing angle compensating layer 23 sets to parallel with a direction substantially parallel to or substantially perpendicular to the aligning treatment direction of the second alignment film 8 formed on the front substrate 3.

Figure 4:
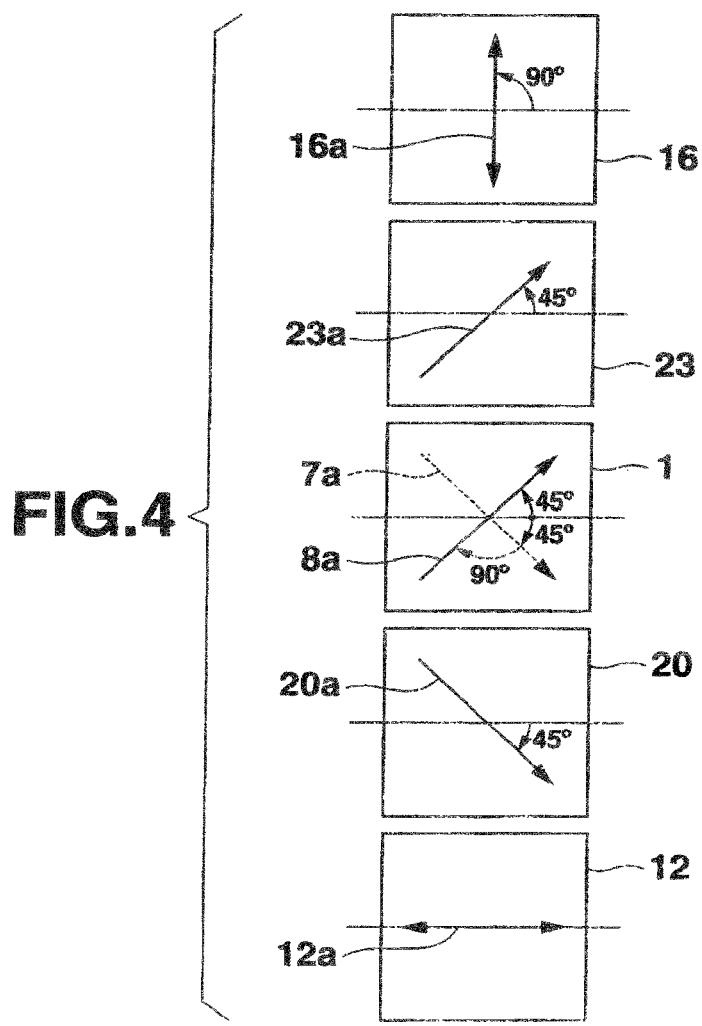
FIG. 4 is a view showing aligning treatment directions of first and second alignment films, directions of absorption axes of first and second polarizing layers, and directions of optical axes of first and second viewing angle compensating layers in the first embodiment.

FIG. 4 shows aligning treatment directions 7*a* and 8*a* of the first and second alignment films 7 and 8 of the liquid crystal cell 1, directions of absorption axes 12*a* and 16*a* of the polarizing layers 12 and 16 of the first and second polarizing plates 11 and 15, and directions of optical axis directions 20*a* and 23*a* of the viewing angle compensating layers 20 and 23 of the first and second viewing angle compensating plates 19 and 22.

As shown in FIG. 4, the first alignment film 7 formed on the rear substrate 2 of the liquid crystal cell 1 is aligned in a first direction crossing a lateral axis direction (a direction indicated by an alternate long and short dash line in the drawing) of a screen of the liquid crystal display device clockwise as seen from the observation side at an angle of substantially 45°. The second alignment film 8 formed on the front substrate 3 is aligned in a second direction (a direction crossing the lateral axis direction of the screen counterclockwise as seen from the observation side at an angle of substantially 45°) crossing the first direction at an angle of substantially 90°. The liquid crystal molecules 10*a* in the liquid crystal layer 10 held between the first alignment film 7 of the rear substrate 2 and the second alignment film 8 of the front substrate 3 are twist-aligned in a layer thickness direction of the liquid crystal layer 10 between the first alignment film 7 and the second alignment film 8 at a twisted angle of substantially 90° as indicated by an arrow of a dashed line that shows a twisted direction of a molecular orientation.

In the liquid crystal layer 10 of this liquid crystal cell 1, a value of a retardation apparently varies in the range of substantially $\lambda/2$ with respect to transmitted light in accordance with an alignment state of the liquid crystal molecules 10*a* that changes in accordance with a voltage applied to the liquid crystal layer 10 between the electrodes 4 and 5 on the pair of substrates 2 and 3.

The first polarizing plate 11 facing the outer surface of the rear substrate 2 of the liquid crystal cell 1 is arranged so that the absorption axis 12*a* of the first polarizing layer 12 of this polarizing plate 11 sets to parallel with the lateral axis direction of the screen, i.e., crossing the aligning treatment direction 7*a* of the first alignment film 7 of the rear substrate 2 counterclockwise as seen from the observation side at an angle of substantially 45°. The second polarizing plate 15 facing the outer surface of the front substrate 3 of the liquid crystal cell 1 is arranged so that the absorption axis 16*a* of the second polarizing layer 16 of this polarizing plate 15 sets to parallel with a direction (a direction substantially perpendicular to the lateral axis direction of the screen) substantially perpendicular to the absorption axis 12*a* of the polarizing layer 12 of the first polarizing plate 11.

Further, the first viewing angle compensating plate 19 between the rear surface 2 of the liquid crystal cell 1 and the first polarizing plate 11 is arranged so that the optical axis direction 20*a* of the first viewing angle compensating layer 20 of this viewing angle compensating plate 19 sets to parallel with a direction substantially parallel with the aligning treatment direction 7*a* of the first alignment film 7 of the rear substrate 2. The second viewing angle compensating plate 22 between the front substrate 3 of the liquid crystal cell 1 and the second polarizing plate 15 is arranged so that the optical axis direction 23*a* of the second viewing angle compensating layer 23 of this viewing angle compensating plate 22 sets to parallel with a direction substantially parallel with the aligning treatment direction 8*a* of the second alignment film 8 of the front substrate 3, i.e., a direction substantially perpendicular to the optical axis direction 20*a* of the viewing angle compensating layer 20 of the first viewing angle compensating plate 19.

This liquid crystal display device controls transmission of white illumination light emitted from a non-illustrated surface light source arranged on a rear side thereof (the opposite side of the observation side) by application of a voltage to the liquid crystal layer 10 between the electrodes 4 and 5 in accordance with each of the plurality of pixel portions, and irradiates light of three colors, i.e., red, green, and blue, colored by the color filters 6R, 6G, and 6B of three colors, i.e., red, green, and blue, corresponding to the plurality of pixel portions to the observation side, thereby displaying a color image.

This liquid crystal display device displays a color image having a good color balance because a ratio of the liquid crystal layer thickness $d_R$ of the pixel portion to which the red color filter 6R of the liquid crystal cell 1 is provided (which will be referred to as a red pixel portion hereinafter), the liquid crystal layer thickness $d_G$ of the pixel portion to which the green filter 6G is provided (which will be referred to as a green pixel portion hereinafter), and the liquid crystal layer thickness $d_B$ of the pixel portion to which the blue filter 6B is provided (which will be referred to as a blue pixel portion) is set to $d_R:d_G:d_B=1.1:1.0:0.9$.

Figure 5:
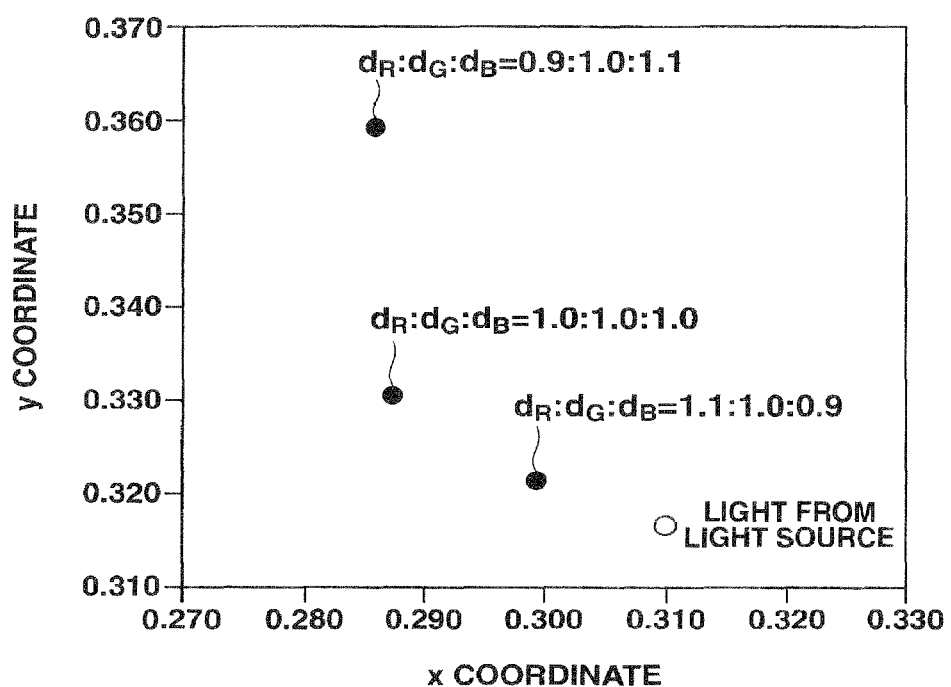
FIG. 5 is a view showing a relationship between a ratio of liquid crystal layer thicknesses $d_R$, $d_G$, and $d_B$ of pixel portions of respective colors, i.e., red, green, and blue and a display chromaticity when white is displayed in the liquid crystal display device according to the first embodiment.

That is, FIG. 5 shows a relationship between the ratio of the liquid crystal layer thickness $d_R$, $d_G$, and $d_B$ of the pixel portions having the respective colors, i.e., red, green, and blue, and a display chromaticity when light is emitted from each of the pixel portions having the colors, i.e., red, green, and blue, to display a white color.

As shown in FIG. 5, comparing examples where the ratio of the liquid crystal layer thicknesses $d_R$, $d_G$, and $d_B$ of the pixel portions having red, green, and blue colors is set to $d_R:d_G:d_B=0.9:1.0:1.1$, $d_R:d_G:d_B=1.0:1.0:1.0$, and $d_R:d_G:d_B=1.1:1.0:0.9$ with each other, a white display chromaticity when the ratio of the liquid crystal layer thicknesses $d_R$, $d_G$, and $d_B$ of the pixel portions having the respective colors is set to $d_R:d_G:d_B=1.1:1.0:0.9$ is a chromaticity close to that of light from a light source (white illumination light from the surface light source) as compared with a white display chromaticity when the ratio of the liquid crystal layer thicknesses $d_R$, $d_G$, and $d_B$ is set to any other value, and hence a color image having a good color balance is displayed.

It is to be noted that this liquid crystal display device is of a normally white type where the first polarizing plate 11 and the second polarizing plate 15 are arranged so that the absorption axes 12a and 16a of the respective polarizing layers 12 and 16 become substantially perpendicular to each other. This liquid crystal display device displays white when no voltage is applied to the liquid crystal layer 10 between the electrodes 4 and 5 of each pixel portion, and displays black when a voltage that is sufficiently high for the substantially all liquid crystal molecules 10a in the layer thickness direction of the liquid crystal layer 10 to rise to be aligned substantially perpendicularly with respect to the substrate surfaces (which will be referred to as a saturation voltage) is applied to the liquid crystal layer 10 between the electrodes 4 and 5 of each pixel portion.

In the liquid crystal cell 1 having the liquid crystal layer 10 in which the liquid crystal molecules 10a are twist-aligned with a twisted angle of substantially 90° between the pair of substrates 2 and 3, a behavior of the liquid crystal molecules 10a in the liquid crystal layer 10 near the pair of substrates 2 and 3 is suppressed by an anchoring effect of the alignment films 7 and 8. Thus, even when the saturation voltage is applied to the liquid crystal layer 10 between the electrodes 4 and 5, the liquid crystal molecules 10a near the pair of substrates 2 and 3 do not rise to be aligned, and an in-plane retardation (which will be referred to as a residual retardation) due to the liquid crystal molecules 10a in the liquid crystal layer 10 near the substrates 2 and 3 is present.

Furthermore, when the saturation voltage is applied to the liquid crystal layer 10 between the electrodes 4 and 5, the liquid crystal layer 10 has a negative phase difference (which will be referred to as a phase difference in the liquid crystal layer thickness direction) in a plane perpendicular to the substrate surfaces.

In the liquid crystal display device in which the first and second polarizing plates 11 and 15 are arranged so that the absorption axes 12a and 16a of the polarizing layers 12 and 16 sets to parallel with a direction forming an angle of substantially 45° with respect to the aligning treatment directions 7a and 8a of the alignment films 7 and 8 in particular, the phase difference in the liquid crystal layer thickness direction greatly functions with respect to light that obliquely enters the substrate surfaces, thereby reducing viewing angle characteristics.

Thus, in the liquid crystal display device according to this embodiment, the first and second viewing angle compensating plates 19 and 22 are respectively arranged between the first and second polarizing plates 11 and 15 arranged on the front and the rear sides of the liquid crystal cell 1 and the rear substrate 2 and the front substrate 3 of the liquid crystal cell 1 so that the first and second viewing angle compensating plates 19 and 22 cancel out the residual retardation. Moreover, the phase difference of the liquid crystal layer 10 in the plane perpendicular to the substrate surfaces when the saturation voltage (a voltage sufficiently high for the liquid crystal molecules 10a to rise to be aligned) is applied to the liquid crystal layer 10 between the electrodes 4 and 5 of the liquid crystal cell 1 is canceled out by the phase differences of the plurality of optical layers within the plane perpendicular to the substrate surfaces. The plurality of optical layers include the base films 14 and 18 on the surfaces of the first and second polarizing plates 11 and 15 facing the liquid crystal cell 1 between the first polarizing layer 12 of the first polarizing plate 11 and the second polarizing layer 16 of the second polarizing plate 15, the respective viewing angle compensating layers 20 and 23 of the first and second viewing angle compensating plates 19 and 22, and the base films 21 and 24 of the first and second viewing angle compensating plates 19 and 22.

That is, a value of a product of the phase difference of the liquid crystal layer 10 in the liquid crystal layer thickness direction and the liquid crystal layer thickness (an average value of the liquid crystal layer thicknesses $d_R$, $d_G$, and $d_B$ of the pixel portions having the respective colors to which the red, the green, and the blue color filters 6R, 6G, and 6B are provided) d is determined as a retardation in the liquid crystal layer thickness direction, and a value of a product of the phase difference in the thickness direction of each of the plurality of optical layers and each layer thickness is determined as a retardation in the thickness direction. At this time, when a value obtained by adding the retardation in the liquid crystal layer thickness direction and the retardations in the thickness direction of the plurality of the optical layers is set to fall within the range of −80 nm to +80 nm (0±80 nm), or preferably to 0 nm, the retardation in the thickness direction of the liquid crystal layer 10 at the time of application of the saturation voltage is canceled out.

Figure 6:
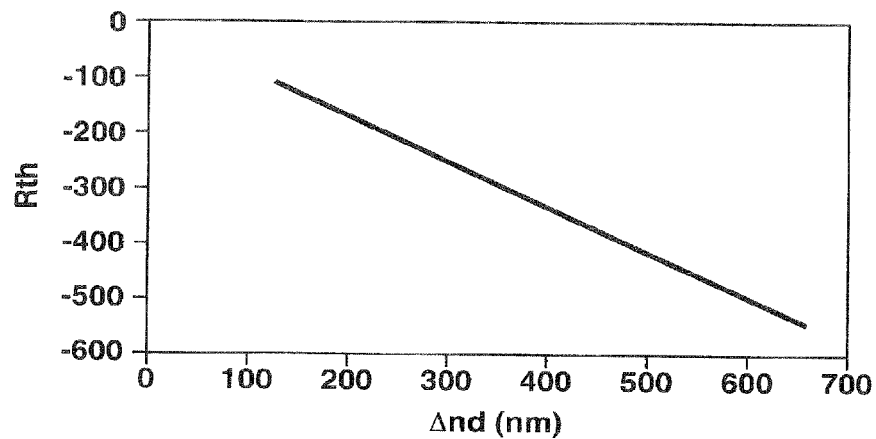
FIG. 6 is a view showing a relationship between $\Delta nd$ of a liquid crystal layer and a retardation $Rth_{LC}$ in a thickness direction of the liquid crystal layer when a saturation voltage is applied in the liquid crystal display device according to the first embodiment.

FIG. 6 shows a relationship between a product Δnd of an anisotropic refractive index Δn and the liquid crystal layer thickness d of a liquid crystal material constituting the liquid crystal layer 10 and a liquid crystal layer thickness direction retardation $Rth_{LC}$ of the liquid crystal layer 10 when the saturation voltage is applied on the assumption that a pre-tilt angle of the liquid crystal molecules 10a is 5.5° and the saturation voltage is 4V. The liquid crystal layer thickness direction retardation $Rth_{LC}$ of the liquid crystal layer 10 when the saturation voltage is applied varies as shown in the drawing in accordance with a value of the product Δnd of the liquid crystal layer 10. That is, the retardation $Rth_{LC}$ in the liquid crystal layer thickness direction linearly varies with respect to a change in a value of the product Δn of the liquid crystal layer 10. Thus, the retardation $Rth_{LC}$ is obtained by multiplying the value of the product Δnd of the liquid crystal layer 10 by a coefficient corresponding to an inclination of the straight line depicted in FIG. 6.

Thus, it is good enough to set an absolute value obtained by adding values of the retardations in the thickness direction of the plurality of optical layers excluding the liquid crystal layer 10 between the first polarizing layer 12 of the first polarizing plate 11 and the second polarizing layer 16 of the second polarizing plate 15 to match with an absolute value obtained by multiplying a value of Δnd of the liquid crystal layer 10 by a coefficient preset in accordance with the pre-tilt angle of the liquid crystal molecules 10a and the saturation voltage, or set a difference between the respective absolute values to fall within the range of −80 nm to +80 nm.

The next Table 1 shows a relationship between the retardation $Rth_{LC}$ in the liquid crystal layer thickness direction of the liquid crystal layer 10 having the liquid crystal molecules 10a with a pre-tilt angle and a saturation voltage being changed and a coefficient value that is multiplied with respect to a value Δnd of the liquid crystal layer to calculate a value of the retardation in the thickness direction of each of the plurality of optical layers.

TABLE 1

| Pre-tilt | Saturation voltage | $Rth_{LC}$ | Coefficient |
|---|---|---|---|
| 0.5° | 3 V | −299.43 | 0.72 |
| 5.5° | 3 V | −311.03 | 0.75 |
| 10.5° | 3 V | −321.85 | 0.77 |
| 0.5° | 4 V | −338.46 | 0.81 |
| 5.5° | 4 V | −345.40 | 0.83 |
| 10.5° | 4 V | −352.11 | 0.85 |
| 0.5° | 5 V | −358.35 | 0.86 |
| 5.5° | 5 V | −363.41 | 0.87 |
| 10.5° | 5 V | −368.32 | 0.86 |

As shown in Table 1, when the pre-tilt angle of the liquid crystal molecules 10a falls within the range of 0.5° to 10.5° and the saturation voltage falls within the range of 3V to 5V, a value of the retardation in the liquid crystal layer thickness direction of the liquid crystal layer 10 at the time of applying the saturation voltage is calculated by multiplying a coefficient falling within the range of 0.72 to 0.86 by a value of Δnd of the liquid crystal layer. Here, the value of the retardation in the liquid crystal thickness direction of the liquid crystal layer 10 at the time of applying the saturation voltage and a total value of the retardations in the thickness direction of the plurality of optical layers excluding the liquid crystal layer 10 have substantially the same absolute values, and have opposite signs.

Thus, in this embodiment, the total value of the retardations in the thickness direction of the plurality of optical layers between the first polarizing layer 12 and the second polarizing layer 16 excluding the liquid crystal layer 10 is set to a value obtained by multiplying the value of Δnd of the liquid crystal layer 10 by a coefficient falling within the range of 0.72 to 0.86, and a total value of the values of the retardations in the thickness direction of the plurality of optical layers excluding the liquid crystal layer 10 and the retardation in the liquid crystal layer thickness direction of the liquid crystal layer 10 at the time of applying the saturation voltage is set to fall within the range of 0±80 nm (−80 nm to +80 nm). In this case, as the value of the retardation in the liquid crystal layer thickness direction of the liquid crystal layer 10 at the time of applying the saturation voltage, a value obtained by multiplying a coefficient 0.83 by the value of Δnd of the liquid crystal layer 10.

Figure 7:
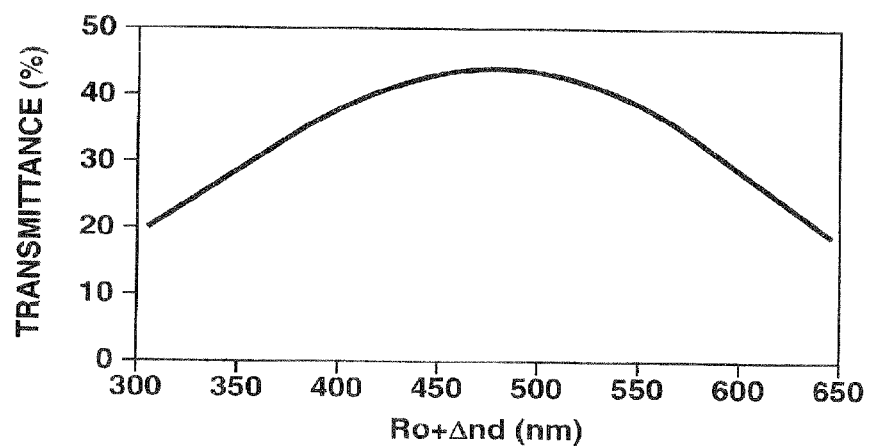
FIG. 7 is a view showing a relationship between an in-plane retardation Ro, $\Delta nd$ of the liquid crystal layer, and a transmittance, the in-plane retardation Ro being obtained by adding respective in-plane retardation values of base films of a plurality of optical layers between the first and second polarizing layers excluding the liquid crystal layer in the liquid crystal display device according to the first embodiment.

Additionally, FIG. 7 shows a transmittance of the liquid crystal display device with respect to a value Ro+Δnd that is obtained by adding an in-plane retardation Ro acquired by adding values of in-plane retardations of the plurality of optical layers excluding the liquid crystal layer 10 between the first polarizing layer 12 of the first polarizing plate 11 and the second polarizing layer of the second polarizing plate in the liquid crystal display device to the product Δnd of the liquid crystal layer 10. The plurality of optical layers include the base films 14 and 18 on the surfaces of the first and second polarizing plates 11 and 15 facing the liquid crystal cell 1, the viewing angle compensating layers 20 and 23 of the first and second viewing angle compensating plates 19 and 22, and the base films 21 and 24 of the first and second viewing angle compensating plates 19 and 22. The liquid crystal display device demonstrates a high transmittance when a value of Ro+Δnd falls within the range of 350 nm to 600 nm, and a peak when a value of Ro+Δnd is 480 nm in particular.

Thus, in this embodiment, a value obtained by adding a total value of the in-plane retardations each of which is a product of an in-plane phase difference in a plane parallel to the substrate surfaces of each of the plurality of optical layers between the first polarizing layer 12 and the second polarizing layer 16 and a layer thickness of the optical layer to Δnd of the liquid crystal layer 10 is set to the range of 350 nm to 600 nm, or preferably 480 nm.

In more detail, in the liquid crystal display device according to this embodiment, an optical function of the base films 13 and 17 placed outside the first and second polarizing layers 12 and 16 of the first and second polarizing plates 11 and 15 does not concern visibility of an observer. Further, the plurality of optical layers between the first polarizing layer 12 and the second polarizing layer 16 concern visibility of the observer, the plurality of optical layers including the base films 14 and 18 of the first and second polarizing plates 11 and 15, the first and second viewing angle compensating layers 20 and 23 of the first and second viewing angle compensating plates 19 and 22, the base films 21 and 24 of these compensating layers 20 and 23, and the liquid crystal layer 10.

Figure 14:
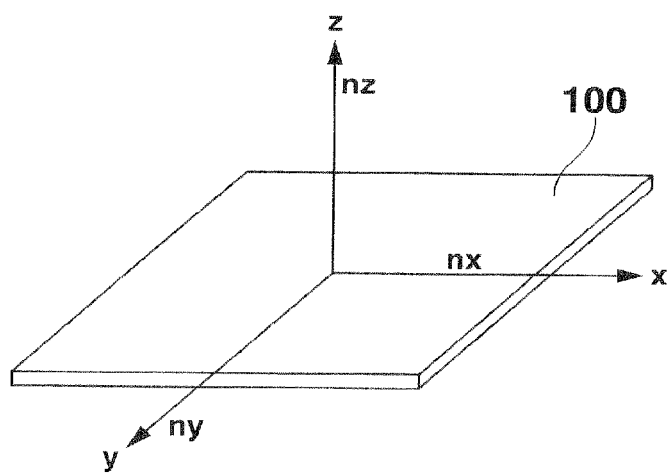
FIG. 14 is a perspective view for explaining characteristics of an optical film in the liquid crystal display device according to the third embodiment.

As depicted in FIG. 14 showing X, Y, and Z coordinates of an optical medium 100 and refractive indices in respective coordinate axis directions, in regard to each of the plurality of optical layers of the optical medium 100, assuming that one and the other of two directions perpendicular to each other on a plane parallel to the substrate surfaces are an X axis and a Y axis, a thickness direction perpendicular to the substrate surfaces is a Z axis, a refractive index in the X axis direction is nx, a refractive index in the Y axis direction is ny, a refractive index in the Z axis direction is nz, and a layer thickness of the optical layer is d, a retardation Rthi in the thickness direction of each optical layer is expressed as $\{(nx+ny)/2-nz\}\cdot d$. Assuming that Rth is a total retardation in the thickness direction obtained by adding values of the retardations Rthi in the thickness direction of these optical layers and Δnd is a product of an anisotropic refractive index Δn of a liquid crystal material constituting the liquid crystal layer 10 and an average liquid crystal layer thickness d, the total retardation Rth in the thickness direction is set to fall within the range satisfying the following expression:

$$Rth = 0.83\Delta nd \pm 80 \text{ nm}.$$

That is, the total retardation Rth in the thickness direction is set to fall within the range of 0.83Δnd−80 nm to 0.83Δnd+80 nm.

Furthermore, in retard to the plurality of optical layers between the first polarizing layer 12 and the second polarizing layer 16, assuming that Roi is an in-plane retardation of each optical layer expressed as $(nx-ny)\cdot d$ and Ro is an in-plane retardation obtained by adding values of in-plane retardations Roi of the respective optical layers, the totalized in-plane retardation Ro is set to the range satisfying the following expression:

$$Ro + \Delta nd = 350 \text{ nm to } 600 \text{ nm}.$$

In the liquid crystal display device according to this embodiment, a value of Δnd of the liquid crystal layer 10 of the liquid crystal cell 1 is 380 nm; values of the retardation Rthi in the thickness direction and the in-plane retardation Roi of the first and the second viewing angle compensating layers 20 and 23, Rthi=70 nm and Roi=−47 nm; values of the retardation Rthi in the thickness direction and the in-plane retardation Roi of the base films 14 and 18 on the surfaces of the first and second polarizing layers 12 and 16 facing the liquid crystal cell 1 and the base films 21 and 24 of the first and second viewing angle compensating layers 20 and 23, Rthi=89 mm and Roi=9 nm.

Thus, the retardation Rth in the thickness direction obtained by adding values of the retardations Rthi in the thickness direction, which is expressed as $\{(nx+ny)/2-nz\}\cdot d$, of the plurality of the optical layers between the first polarizing layer 12 and the second polarizing layer 16 excluding the liquid crystal layer 10 is 353 nm, and the in-plane retardation Ro obtained by adding values of the in-plane retardations Roi of the plurality of optical layers is 12 nm. Accordingly, the value 0.83Δnd obtained by multiplying the value of Δnd of the liquid crystal layer 10 by the preferable coefficient 0.83 is 315 nm, and the value 353 nm as the added retardation Rth in the thickness direction falls within the range of a value obtained by adding 80 nm to −315 nm or +315 nm as a value of 0.83Δnd. Furthermore, the value obtained by totalizing the added in-plane retardation Ro and Δnd is 392 nm, and falls within the range of 350 nm to 600 nm that defines the range of Ro+Δnd.

Since this liquid crystal display device has the above-explained structure, angle dependency of the transmittance is improved, and a display wide viewing angle is increased.

Figure 8A:
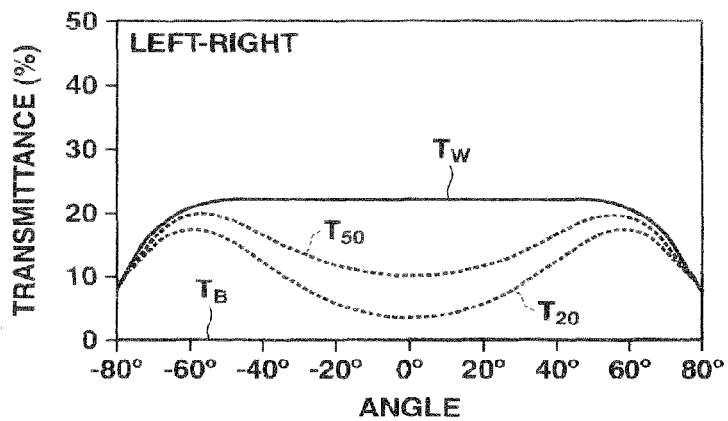
FIGS. 8A to 8D are viewing angle characteristic views at the time of white display $T_W$, black display $T_B$, 50% gradation (a gradation with 50% brightness of white display) display $T_{50}$, and 20% gradation (a gradation with 20% brightness of white display) display $T_{20}$ in the liquid crystal display device according to the first embodiment.
Figure 8B:
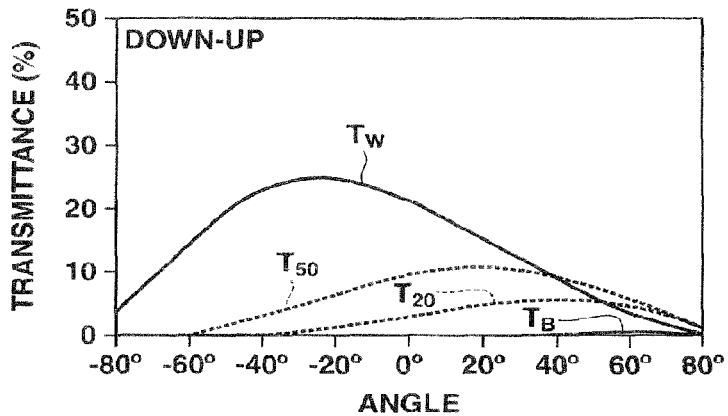
Figure 8C:
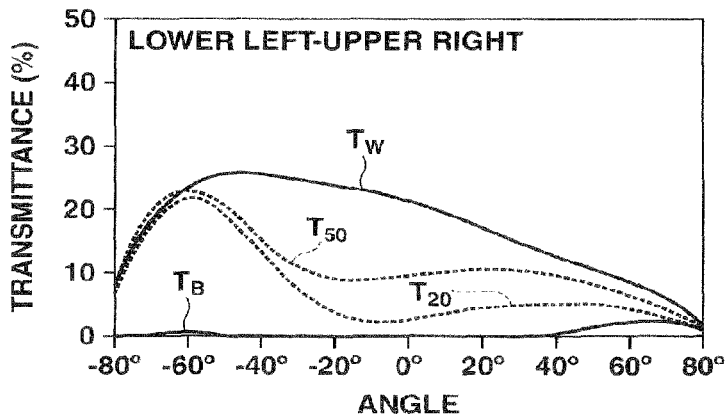
Figure 8D:
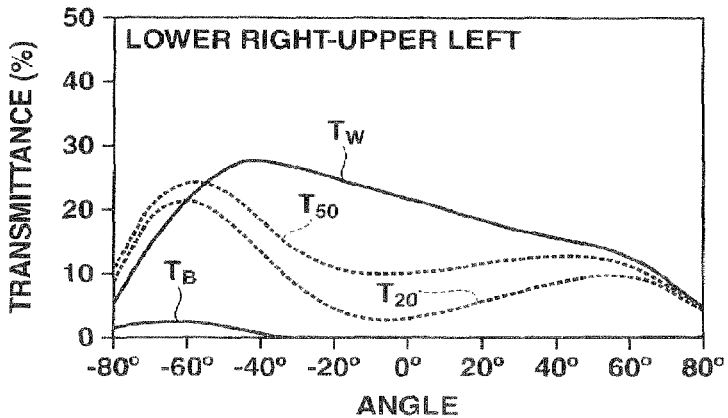

FIGS. 8A to 8D are viewing angle characteristic views at the time of white display $T_W$, black display $T_B$, 50% gradation (a gradation with 50% brightness of white display) display $T_{50}$, and 20% gradation (a gradation with 20% brightness of white display) display $T_{20}$ of the liquid crystal display device. FIG. 8A shows viewing angle characteristics in a right-and-left direction of the screen, FIG. 8B shows viewing angle characteristics in an up-and-down direction of the screen, FIG. 8C shows viewing angle characteristics in a direction from a lower left side to a lower right side of the screen, and FIG. 8D shows viewing angle characteristics in a direction from a lower right side to an upper left side of the screen.

It is to be noted that a negative angle is an angle in the left direction and a positive angle is an angle in the right direction in FIG. 8A. In FIG. 8B, a negative angle is an angle in the lower direction a positive angle is an angle in the upper direction. In FIG. 8C, a negative angle is an angle in the lower left direction and a positive angle is an angle in the upper right direction. In FIG. 8D, a negative angle is an angle in the lower right direction and a positive angle is an angle in the upper left direction.

As shown in FIGS. 8A to 8D, the liquid crystal display device has the viewing angle characteristics that the angle dependency of a transmittance in each direction, i.e., the right-and-left direction, the up-and-down direction, the direction from the lower left to the lower right, and the direction from the lower right to the upper left in the screen is improved, i.e., inversion of the intermediate gradation does not occur in a wide angle range in each of these directions. In particular, the viewing angle is wide in the right-and-left direction, the direction from the lower left to the lower right, and the direction from the lower right to the upper left.

(Modification of First Embodiment)

It is to be noted that a value of Δnd of the liquid crystal layer 10 in the liquid crystal cell 1 is set to 380 nm in the liquid crystal display device, but the value of Δnd of the liquid crystal layer 10 may be set to any other value.

Figure 9A:
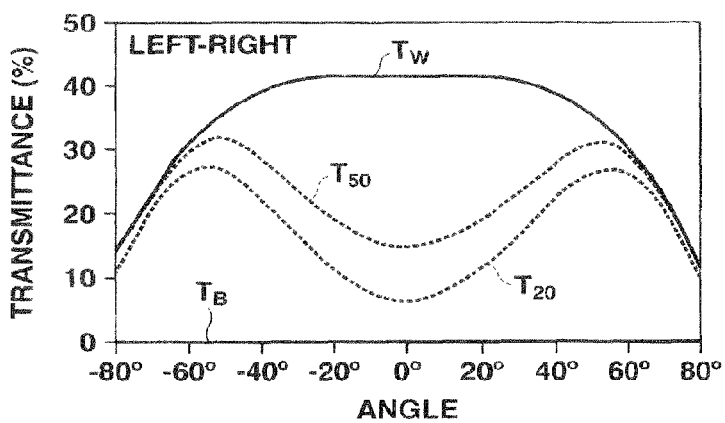
FIGS. 9A to 9D are viewing angle characteristic views at the time of white display $T_W$, black display $T_B$, 50% gradation (a gradation with 50% brightness of white display) display $T_{50}$, and 20% gradation (a gradation with 20% brightness of white display) display $T_{20}$ in the liquid crystal display device according to a modification of the first embodiment.
Figure 9B:
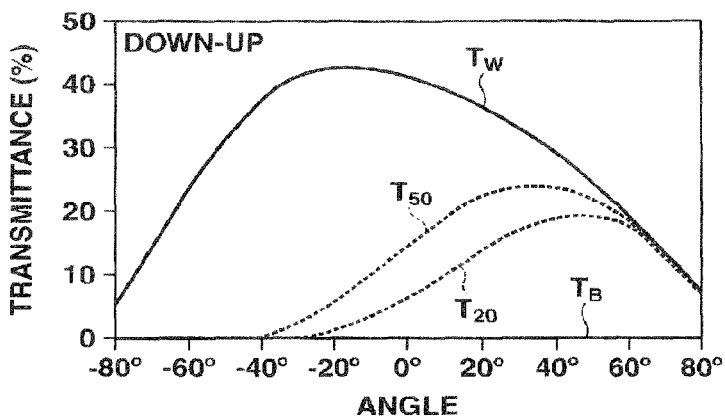
Figure 9C:
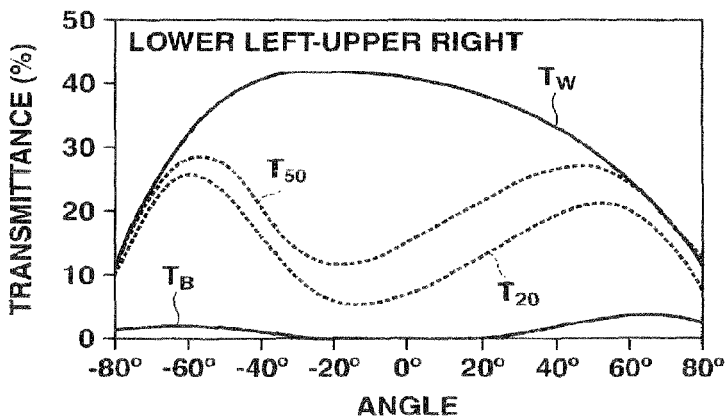
Figure 9D:
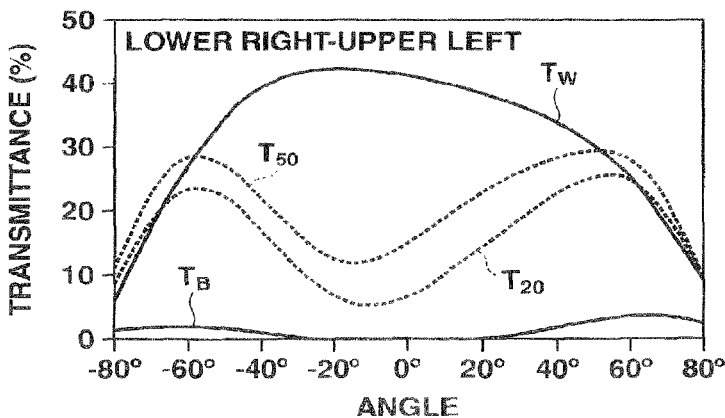

FIGS. 9A to 9D are viewing angle characteristic views at the time of white display $T_W$, black display $T_B$, 50% gradation display $T_{50}$, and 20% gradation display $T_{20}$ in a liquid crystal display device in which a value of Δnd of the liquid crystal layer 10 is set to 505 nm and the other structures are the same as those in the foregoing embodiment. FIG. 9A shows viewing angle characteristics in the right-and-left direction of the screen, FIG. 9B shows viewing angle characteristics in the up-and-down direction of the screen, FIG. 9C shows viewing angle characteristics in the direction from the lower left to the lower right of the screen, and FIG. 9D shows viewing angle characteristics in the direction from the lower right to the upper left of the screen.

As shown in FIGS. 9A to 9D, the liquid crystal display device according to this modification has viewing angle characteristics that angle dependency of a transmittance in each direction, i.e., the right-and-left direction, the up-and-down direction, the direction from the lower left to the lower right, and the direction from the lower right to the upper left in the screen is improved and inversion of the intermediate gradation does not occur in a wide angle range in each of these directions. Moreover, contrast is higher than that of the liquid crystal display device according to the foregoing embodiment.

(Second Embodiment)

Figure 10:
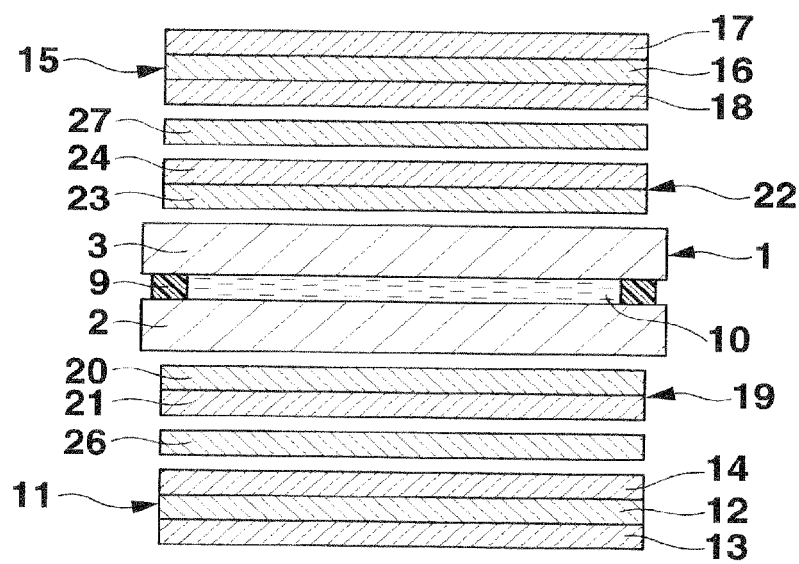
FIG. 10 is a schematic cross-sectional view of a liquid crystal display device showing a second embodiment of the present invention.

FIGS. 10 to 12 show a second embodiment according to the present invention, and they are schematic cross-sectional views of a liquid crystal display device.

The liquid crystal display device according to this embodiment has a structure where a first retardation plate 26 is arranged between the first polarizing plate 11 and the first viewing angle compensating plate 19 and a second retardation plate 27 is arranged between the second polarizing plate 15 and the second viewing angle compensating plate 22 in the liquid crystal display device according to the first embodiment. A plurality of optical layers between a first polarizing layer 12 and a second polarizing layer 16 excluding a liquid crystal layer 10 include base films 14 and 18 on surfaces of the first and second polarizing layers 12 and 16 facing a liquid crystal cell 1, the first and second viewing angle compensating layers 20 and 23, base films 21 and 24 of these compensating layers 20 and 23, and the first and second retardation plates 26 and 27. It is to be noted that other structures of the liquid crystal display device according to this embodiment are substantially the same as those in the first embodiment.

FIG. 11 shows aligning treatment directions 7a and 8a of first and second alignment films 7 and 8 of the liquid crystal cell 1, directions of absorption axes 12a and 16a of the polarizing layers 12 and 16 of the first and second polarizing plates 11 and 15, optical axis directions 20a and 23a of the viewing angle compensating layers 20 and 23 of the first and second viewing angle compensating plates 19 and 22, and directions of retardation axes 26a and 27a of the first and second retardation plates 26 and 27 in the liquid crystal display device according to this embodiment.

As shown in FIG. 11, the aligning treatment directions 7a and 8a of the first and second alignment films 7 and 8 of the liquid crystal cell 1, the directions of the absorption axes 12a and 16a of the polarizing layers 12 and 16 of the first and second polarizing plates 11 and 15, and the optical axis directions 20a and 23a of the viewing angle compensating layers 20 and 23 of the first and second viewing angle compensating plates 19 and 22 are the same as those in the first embodiment. The first retardation plate 26 is arranged so that its retardation axis 26a sets to parallel with a direction substantially parallel with the optical axis direction 20a of the first viewing angle compensating layer 20 of the first viewing angle compensating plate 19. The second retardation plate 27 is arranged so that is retardation axis 27a sets to parallel with a direction substantially parallel with the optical axis direction 23a of the second viewing angle compensating layer 23 of the second viewing angle compensating plate 22.

Additionally, in this embodiment, a value of Δnd of the liquid crystal layer 10 of the liquid crystal cell 1 is set to 420 nm, and values of a retardation Rthi in a thickness direction and an in-plane retardation Roi of each of the first and second viewing angle compensating layers 20 and 23 are set to Rthi=70 nm and Roi=−47 nm. Further, values of a retardation Rthi in the thickness direction and an in-plane retardation Roi of each of base films 14 and 18 of the first and second polarizing layers 12 and 16 facing the liquid crystal cell 1 and each of base films 21 and 24 of the first and second viewing angle compensating layers 20 and 23 are set to Rthi=89 nm and Roi=9 nm. Furthermore, values of a retardation Rthi in the thickness direction and an in-plain retardation Roi of each of the first and second retardation plates 26 and 27 are set to Rthi=175 nm and Roi=35 nm. As explained above, a total value of the retardation value in the thickness direction of each of the plurality of optical layers between the first polarizing layer 12 and the second polarizing layer 16 excluding the liquid crystal layer 10 and the retardation value in the liquid crystal layer direction of the liquid crystal layer 10 at the time of applying a voltage is set to the range of −80 nm to +80 nm.

Figure 12A:
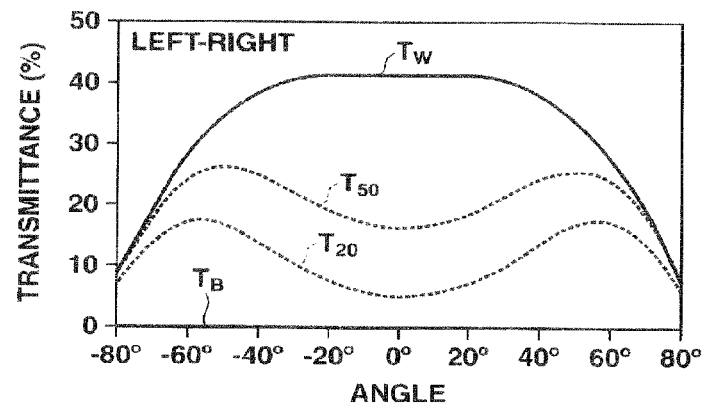
FIGS. 12A to 12D are viewing angle characteristic views at the time of white display $T_W$, black display $T_B$, 50% gradation (a gradation with 50% brightness of white display) display $T_{50}$, and 20% gradation (a gradation with 20% brightness of white display) of display $T_{20}$ in the liquid crystal display in the liquid crystal display device according to the second embodiment.
Figure 12B:
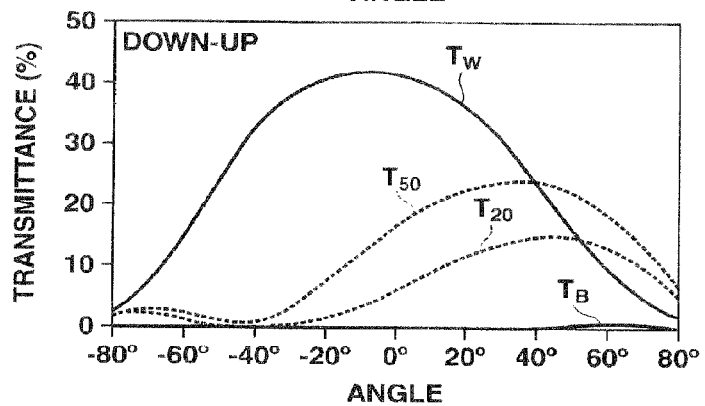
Figure 12C:
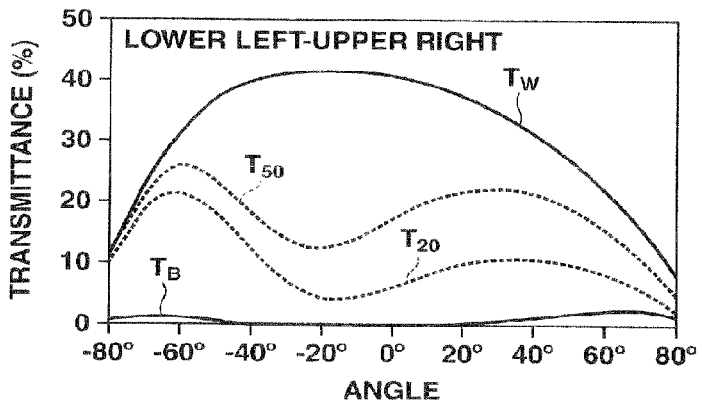
Figure 12D:
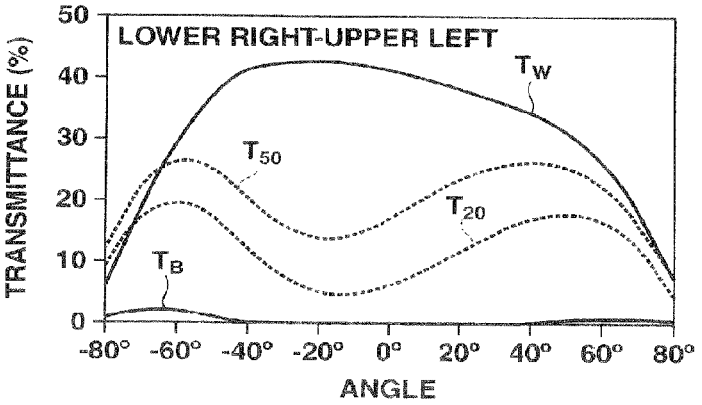

FIGS. 12A to 12D are viewing angle characteristic views at the time of white display $T_W$, black display $T_B$, 50% gradation display $T_{50}$, and 20% gradation display $T_{20}$ of the liquid crystal display device according to this embodiment. FIG. 12A shows viewing angle characteristics in a right-and-left direction of a screen, FIG. 12B shows viewing angle characteristics in an up-and-down direction of the screen, FIG. 12C shows viewing angle characteristics in a direction from the lower left to the lower right of the screen, and FIG. 12D shows viewing angle characteristics in a direction from the lower right to the upper left of the screen.

As shown in FIGS. 12A to 12D, in the liquid crystal display device according to this embodiment, angle dependency of a transmittance in each direction, i.e., the right-and-left direction, the up-and-down direction, the direction from the lower left to the lower right, and the direction from the lower right to the upper left of the screen is improved. Furthermore, this liquid crystal display device has viewing angle characteristics that inversion of the intermediate gradation does not occur in a wide angle range in each of these directions, and a viewing angle is wide and contrast is high in the right-and-left direction, the direction from the lower left to the lower right, and the direction from the lower right to the upper left.

(Third Embodiment)

Figure 13:
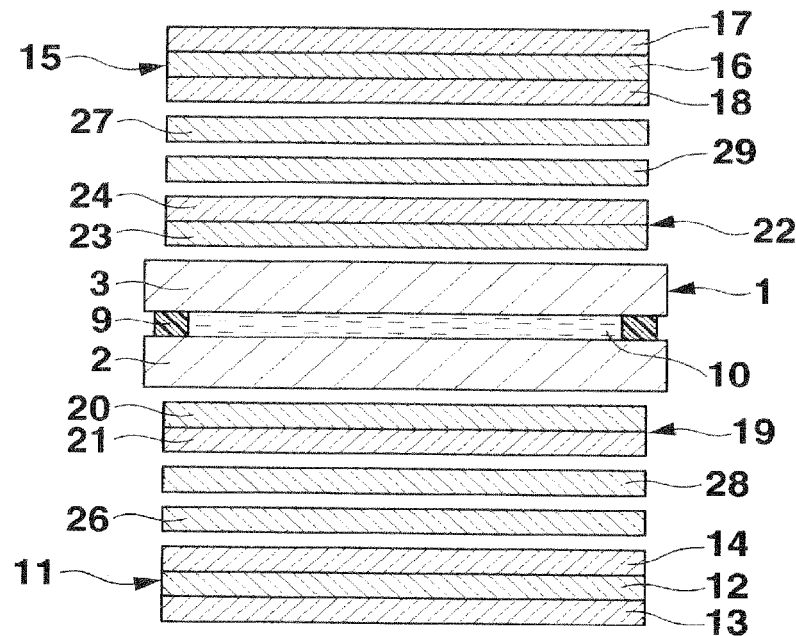
FIG. 13 is a schematic cross-sectional view of a liquid crystal display device showing a third embodiment according to the present invention.

FIGS. 13 to 16 show a third embodiment according to the present invention, and FIG. 13 is a schematic cross-sectional view of a liquid crystal display device.

The liquid crystal display device according to this embodiment has a structure where first and second optical films 28 and 29 having a phase difference are further arranged between the first retardation plate 26 and the first viewing angle compensating plate 19 and between the second retardation plate 27 and the second viewing angle compensating plate 22 in the liquid crystal display device according to the second embodiment. A plurality of optical layers between a first polarizing layer 12 and a second polarizing layer 16 excluding a liquid crystal layer 10 include base films 14 and 18 on surfaces of the first and second polarizing layers 12 and 16 facing a pair of substrates 2 and 3 of a liquid crystal cell 1, the first and second viewing angle compensating layers 20 and 23 and their base films 21 and 24, the first and second retardation plates 26 and 27, and the first and second optical films 28 and 29. It is to be noted that other structures of the liquid crystal display device according to this embodiment are substantially the same as those of the second embodiment.

As shown in FIG. 14, in each of the first and second optical films 28 and 29 as an optical medium 100, a relationship between one refractive index nx and the other refractive index ny in two directions x and y perpendicular to each other in a plane parallel to a film surface of each of the first and second optical films 28 and 29, i.e., parallel to substrate surfaces of the liquid crystal cell 1, and a refractive index nz in a thickness direction z perpendicular to the film surface (the substrate surfaces of the liquid crystal cell 1) is nx=ny>nz.

That is, each of the first and second optical films 28 and 29 is a retardation film having an optical axis in the thickness direction z perpendicular to the film surface.

Figure 15:
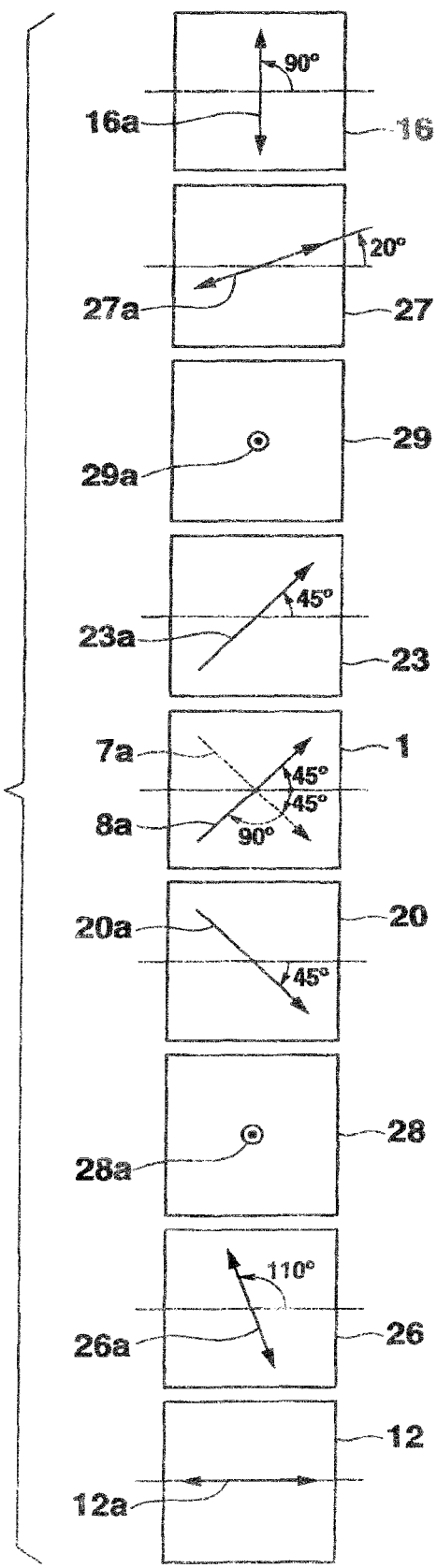
FIG. 15 is a view showing aligning treatment directions of first and second alignment films, directions of absorption axes of first and second polarizing layers, directions of optical axes of first and second viewing angle compensating layers, directions of retardation axes of first and second retardation plates, directions of optical axes of first and second optical films.

FIG. 15 shows aligning treatment directions 7a and 8a of the first and second alignment films 7 and 8 of the liquid crystal cell 1, directions of absorption axes 12a and 16a of the polarizing layers 12 and 16 of the first and second polarizing plates 11 and 15, optical axis directions 20a and 23a of the viewing angle compensating layers 20 and 23 of the first and second viewing angle compensating plates 19 and 22, directions of retardation axes 26a and 27a of the first and second retardation plates 26 and 27, and directions of optical axes 28a and 29a of the first and second optical films 28 and 29.

As shown in FIG. 15, the aligning treatment directions 7a and 8a of the first and second alignment films 7 and 8 of the liquid crystal cell 1, the directions of the absorption axes 12a and 16a of the polarizing layers 12 and 16 of the first and second polarizing plates 11 and 15, and the optical axis directions 20a and 23a of the viewing angle compensating layers 20 and 23 of the first and second viewing angle compensating plates 19 and 22 are the same as those in the first and second embodiments.

On the other hand, the first retardation plate 26 is arranged so that its retardation axis 26a sets to parallel with a direction crossing a lateral axis direction (a direction indicated by an alternate long and shot dash line in the drawing) of the screen counterclockwise as seen from an observation side at an angle of substantially 110°. The second retardation plate 27 is arranged so that its retardation axis 27a sets to parallel with a direction crossing the lateral axis direction of the screen clockwise as seen from the observation side at an angle of substantially 20°, i.e., a direction substantially perpendicular to the retardation axis 26a of the first retardation plate 26. It is to be noted that the directions of the optical axes 28a and 29a of the first and second optical films 28 and 29 are perpendicular to the substrate surfaces of the liquid crystal cell 1.

Furthermore, in this embodiment, a value of Δnd of the liquid crystal layer 10 of the liquid crystal cell 1 is set to 385 nm, and values of a retardation Rthi in a thickness direction and an in-plane retardation Roi of each of the first and second viewing angle compensating layers 20 and 23 are set to Rthi=159 nm and Roi=−38 nm. Moreover, values of a retardation Rthi in the thickness direction and an in-plane retardation Roi of each of base films 14 and 18 on surfaces of the first and second polarizing layers 12 and 16 facing the liquid crystal cell 1 and each of base films 21 and 24 of the first and second viewing angle compensating layers 20 and 23 are set to Rthi=89 nm and Roi=9 nm. Additionally, values of a retardation Rthi in the thickness direction and an in-plane retardation Roi of each of the first and second retardation plates 26 and 27 are set to Rthi=50 nm and Roi=64 nm. Further, a retardation Rthi in the thickness direction of each of the first and second optical films 28 and 29 is set to −160 nm (an in-plane retardation Roi of this optical film 28 or 29 is set to zero). As explained above, a total value of the values of the retardations in the thickness direction of the plurality of optical layers between the first polarizing layer 12 and the second polarizing layer 16 excluding the liquid crystal layer 10 and the value of the retardation in the liquid crystal layer thickness direction of the liquid crystal layer 10 is set to the range of 0±80 nm.

Figure 16A:
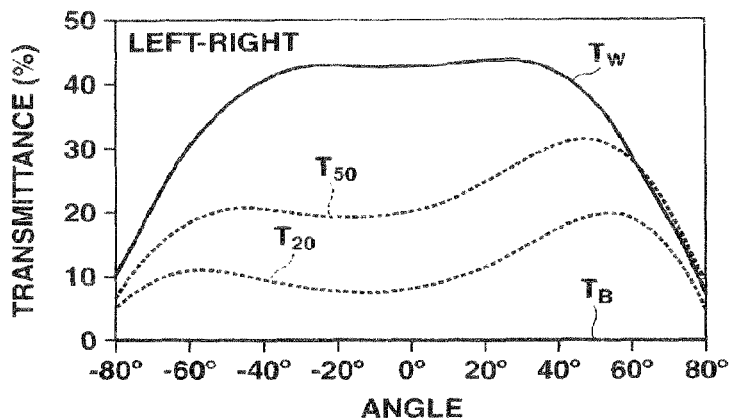
FIGS. 16A to 16D are viewing angle characteristic views at the time of white display $T_W$, black display $T_B$, 50% gradation (a gradation with 50% brightness of white display) display $T_{50}$, and 20% gradation (a gradation with 20% brightness of white display) display $T_{20}$ in the liquid crystal display device according to the third embodiment.
Figure 16B:
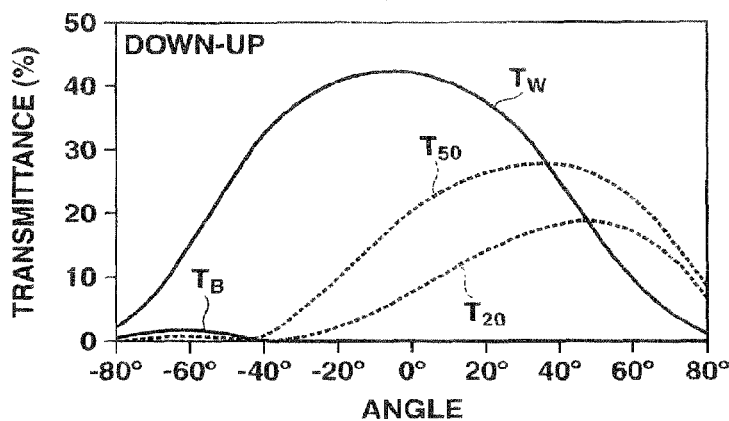
Figure 16C:
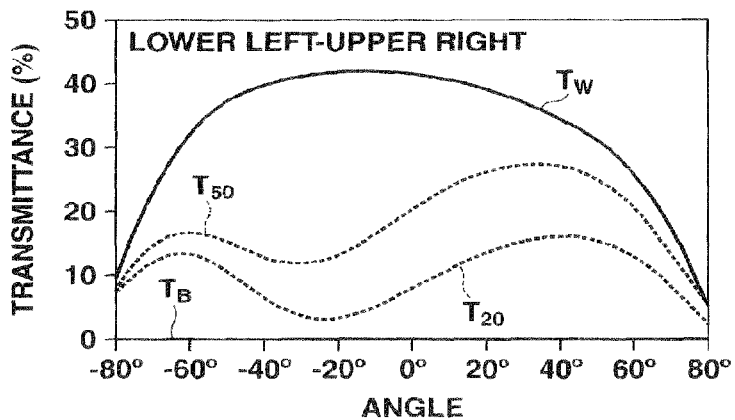
Figure 16D:
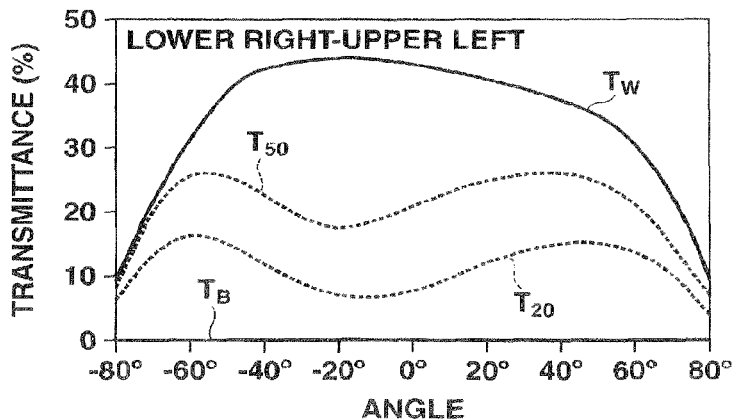

FIGS. 16A to 16D are viewing angle characteristic views at the time of white display $T_W$, black display $T_B$, 50% gradation display $T_{50}$, and 20% gradation display $T_{20}$ of the liquid crystal display device according to this embodiment. FIG. 16A shows viewing angle characteristics in a right-and-left direction of a screen, FIG. 16B shows viewing angle characteristics in an up-and-down direction of the screen, FIG. 16C shows viewing angle characteristics in a direction from the lower left to the lower right of the screen, and FIG. 16D shows viewing angle characteristics in a direction from the lower right to the upper left of the screen.

As shown in FIGS. 16A to 16D, the liquid crystal display device according to this embodiment has viewing angle characteristics that angle dependency of a transmittance in each direction, i.e., the right-and-left direction, the up-and-down direction, the direction from the lower left to the lower right, and the direction from the lower right to the upper left in the screen is improved and inversion of the intermediate gradation does not occur in a wide angle range in each of the these directions. A viewing angle is wide and contrast is high in the right-and-left direction, the direction from the lower left to the lower right, and the direction from the lower right to the upper left in particular.

(Fourth Embodiment)

Figure 17:
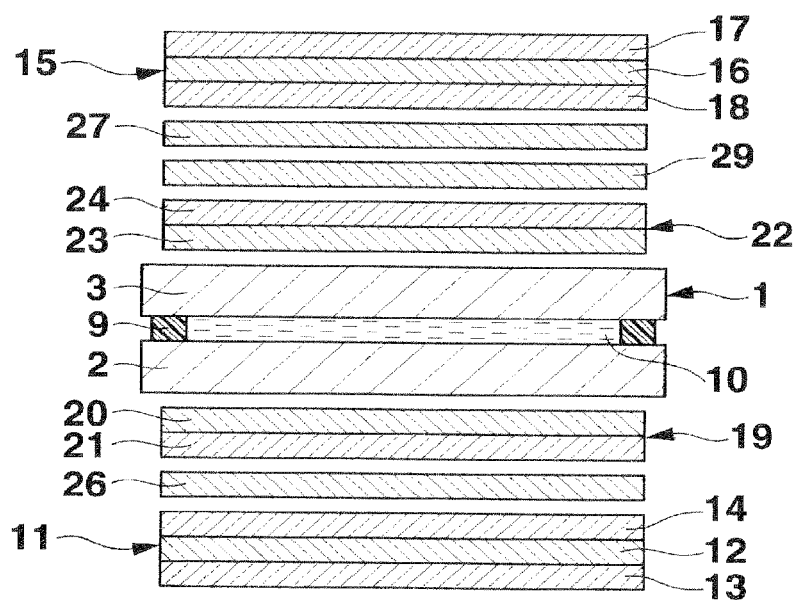
FIG. 17 is a schematic cross-sectional view of a liquid crystal display device showing a fourth embodiment of the present invention.
Figure 18:
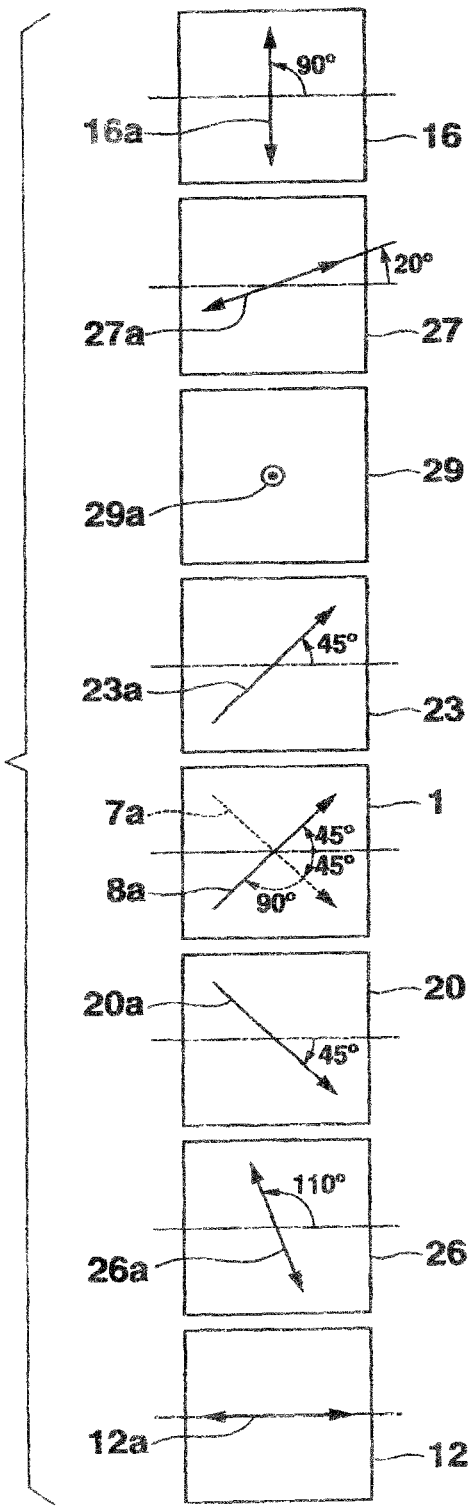
FIG. 18 is a view showing aligning treatment directions of first and second alignment films, directions of absorption axes of first and second polarizing layers, directions of optical axes of first and second viewing angle compensating layers, directions of retardation axes of first and second retardation plates, and directions of optical axes of optical films in the liquid crystal display device according to the fourth embodiment.

FIGS. 17 to 19 show a fourth embodiment according to the present invention, and FIG. 17 is a schematic cross-sectional view of a liquid crystal display device.

The liquid crystal display device according to this embodiment has a structure where the optical film 29 provided in the third embodiment is further arranged either between the first retardation plate 26 and the first viewing angle compensating plate 19 or between the second retardation plate 27 and the second viewing angle compensating plate 22, e.g., between the first retardation plate 26 and the first viewing angle compensating plate 19 in the liquid crystal display device according to the second embodiment. A plurality of optical layers between a first polarizing layer 12 and a second polarizing layer 16 excluding a liquid crystal layer 10 include base films 14 and 18 on surfaces of the first and second polarizing layers 12 and 16 facing a pair of substrates 2 and 3 of a liquid crystal cell 1, the first and second viewing angle compensating layers 20 and 23 and their base films 21 and 24, the first and second retardation plates 26 and 27, and the optical film 29. It is to be noted that other structures of the liquid crystal display device according to this embodiment are substantially the same as those according to the third embodiment.

FIG. 18 show aligning treatment directions 7a and 8a of first and second alignment films 7 and 8 of the liquid crystal cell 1, directions of absorption axes 12a and 16a of the polarizing layers 12 and 16 of the first and second polarizing plates 11 and 15, optical axis directions 20a and 23a of the viewing angle compensating layers 20 and 23 of the first and second viewing angle compensating plates 19 and 22, directions of retardation axes 26a and 27a of the first and second retardation plates 26 and 27, and a direction of an optical axis 29a of the optical film 29.

As shown in FIG. 18, the aligning treatment directions 7a and 8a of the first and second alignment films 7 and 8 of the liquid crystal cell 1, the directions of the absorption axes 12a and 16a of the polarizing layers 12 and 16 of the first and second polarizing plates 11 and 15, and the optical axis directions 20a and 23a of the viewing angle compensating layers 20 and 23 of the first and second viewing angle compensating plates 19 and 22 are the same as those in the second embodiment. Further, the direction of the retardation axis 26a of the first retardation plate 26, the direction of the retardation axis 27a of the second retardation plate 27 are the same as those in the third embodiment. It is to be noted that the direction of the optical axis 29a of the optical film 29 is perpendicular to substrate surfaces of the liquid crystal cell 1.

Furthermore, in this embodiment, a value of Δnd of the liquid crystal layer 10 in the liquid crystal cell 1 is set to 386 nm, and values of a retardation Rthi in a thickness direction and an in-plane retardation Roi of each of the first and second viewing angle compensating layers 20 and 23 are set to Rthi=159 nm and Roi=−38 nm. Moreover, values of a retardation Rthi in the thickness direction and an in-plane retardation Roi of each of the base films 14 and 18 on the surfaces of the first and second polarizing layers 12 and 16 facing the liquid crystal cell 1 and each of the base films 21 and 24 of the first and second viewing angle compensating layers 20 and 23 are set to Rthi=89 nm and Roi=9 nm. Additionally, values of a retardation Rthi in the thickness direction and an in-plane retardation Roi of each of the first and second retardation plates 26 and 27 are set to Rthi=50 nm and Roi=64 nm. Further, a retardation Rthi in the thickness direction of the optical film 28 is set to −160 nm (an in-plane retardation Roi of this optical film 28 is 0). In this manner, a total value of the value of the retardations in the thickness value of the plurality of optical layers between the first polarizing layer 12 and the second polarizing layer 16 excluding the liquid crystal layer 10 and a value of a retardation in the liquid crystal layer thickness direction of the liquid crystal layer 10 is set to fall within the range of 0±80 nm.

Figure 19A:
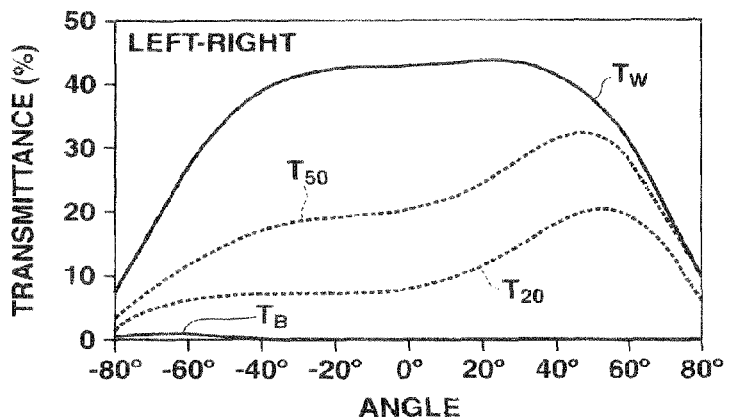
FIGS. 19A to 19D are viewing angle characteristic views at the time of white display $T_W$, black display $T_B$, 50% gradation (a gradation with 50% brightness of white display) display $T_{50}$, and 20% gradation (a gradation with 20% brightness of white display) display $T_{20}$ in the liquid crystal display device according to the fourth embodiment.
Figure 19B:
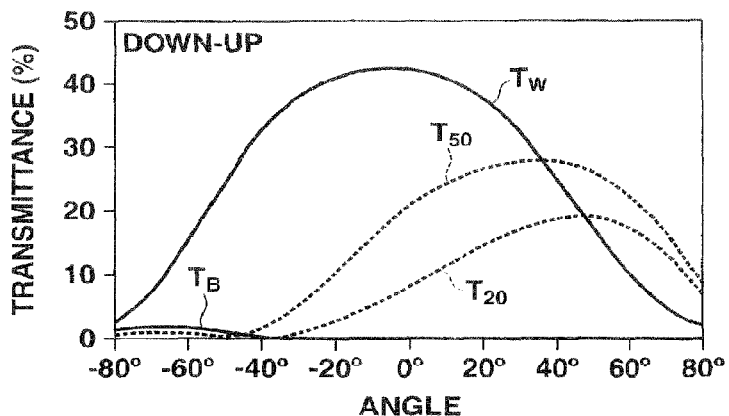
Figure 19C:
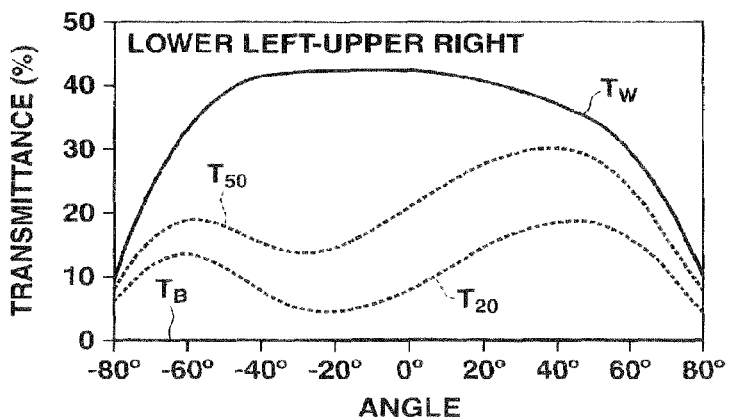
Figure 19D:
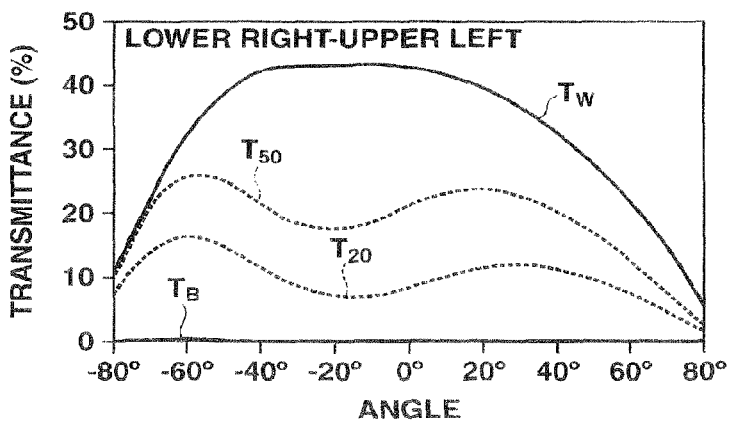

FIGS. 19A to 19D are viewing angle characteristic views at the time of white display $T_W$, black display $T_B$, 50% gradation display $T_{50}$, and 20% gradation display $T_{20}$ of the liquid crystal display device according to this embodiment. FIG. 19A shows viewing angle characteristics in a right-and-left direction of a screen, FIG. 19B shows viewing angle characteristics in an up-and-down direction of the screen, FIG. 19C shows viewing angle characteristics in a direction from the lower left to the lower right, and FIG. 19D shows viewing angle characteristics in a direction from the lower right to the upper left.

As shown in FIGS. 19A to 19D, the liquid crystal display device according to this embodiment has viewing angle characteristics that angle dependency of a transmittance in each direction, i.e., the right-and-left direction, the up-and-down direction, the direction from the lower left to the lower right, and the direction from the lower right to the upper left is improved and inversion of an intermediate gradation does not occur in a wide angle range in each of the these direction. In particular, a viewing angle is wide and contrast is high in the right-and-left direction, the direction from the lower left to the lower right, and the direction from the lower right to the upper left.

(Fifth Embodiment)

Figure 20:
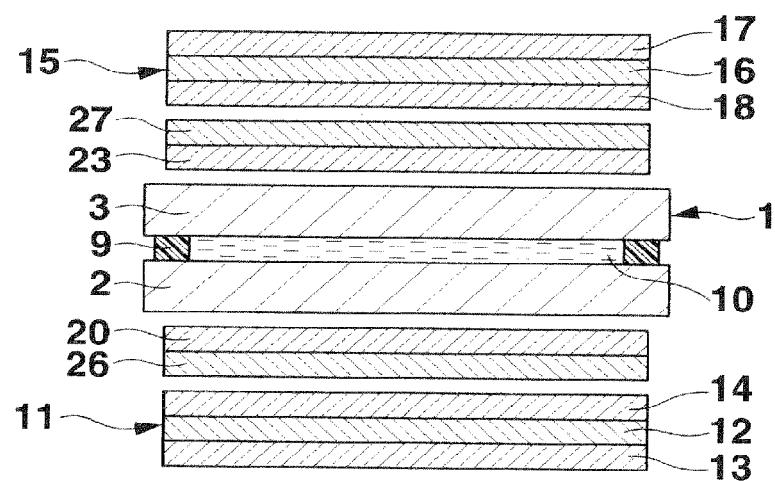
FIG. 20 is a schematic cross-sectional view of a liquid crystal display device according to a fifth embodiment of the present invention.

FIGS. 20 to 22 show a fifth embodiment according to the present invention, and FIG. 20 is a schematic cross-sectional view of a liquid crystal display device.

The liquid crystal display device according to this embodiment has a structure where first and second viewing angle compensating layers 20 and 23 are formed on plate surfaces of first and second retardation plates 26 and 27 in the liquid crystal display device according to the second embodiment. A plurality of optical layers between a first polarizing layer 12 and a second polarizing layer 16 excluding a liquid crystal layer 10 include base films 14 and 16 on surfaces of the first and second polarizing layers 12 and 16 facing a pair of substrates 2 and 3 of a liquid crystal cell 1, the first and second viewing angle compensating layers 20 and 23, and the first and second retardation plates 26 and 27. It is to be noted that other structures of the liquid crystal display device according to this embodiment are substantially the same as those in the second embodiment.

FIG. 21 shows aligning treatment directions 7a and 8a of first and second alignment films 7 and 8 of the liquid crystal cell 1, directions of absorption axes 12a and 16a of the polarizing layers 12 and 16 of first and second polarizing plates 11 and 15, optical axis directions 20a and 23a of the first and second viewing angle compensating layers 20 and 23, and directions of retardation axes 26a and 27a of the first and second retardation plates 26 and 27 in the liquid crystal display device according to the present invention.

As shown in FIG. 21, the aligning treatment directions 7a and 8a of the first and second alignment films 7 and 8 of the liquid crystal cell 1, the directions of the absorption axes 12a and 16a of the polarizing layers 12 and 16 of the first and second polarizing plates 11 and 15, and the optical axis directions 20a and 23a of the first and second viewing angle compensating layers 20 and 23 are the same as those in the first embodiment. Furthermore, the direction of the retardation axis 26a of the first retardation plate 26 and the direction of the retardation axis 27a of the second retardation plate 27 are the same as those in the third embodiment.

Moreover, in this embodiment, a value of $\Delta nd$ of the liquid crystal layer 10 in the liquid crystal cell 1 is set to 385 nm, and values of a retardation Rthi in a thickness direction and an in-plane retardation Roi of each of the first and second viewing angle compensating layers 20 and 23 are set to Rthi=70 nm and Roi=−47 nm. Additionally, values of a retardation Rthi in the thickness direction and an in-plane retardation Roi of each of the base films 14 and 18 on the surfaces of the first and second polarizing layers 12 and 16 facing the liquid crystal cell 1 are set to Rthi=89 nm and Roi=9 nm. Further, values of a retardation Rthi in the thickness direction and an in-plane retardation Roi of each of the first and second retardation plates 26 and 27 are set to Rthi=55 nm and Roi=71 nm. In this manner, a total value of the retardation values in the thickness direction of the plurality of optical layers between the first polarizing layer 12 and the second polarizing layer 16 excluding the liquid crystal layer 10 and a retardation value in a liquid crystal layer thickness direction of the liquid crystal layer 10 is set to fall within the range of 0±80 nm.

In the liquid crystal display device according to this embodiment, since the first and second viewing angle compensating layers 20 and 23 are formed on the plate surfaces of the first and second retardation plates 26 and 27, the base films 14 and 18 alone on the surfaces of the first and second polarizing layers 12 and 16 facing the liquid crystal cell 1 are determined as the base films having the retardations in the thickness direction among the plurality of optical layers between the first polarizing layer 12 and the second polarizing layer 16. Since the number of the base films having the retardations in the thickness direction is reduced in this manner, the angle dependency of a transmittance is further efficiently improved.

Figure 22A:
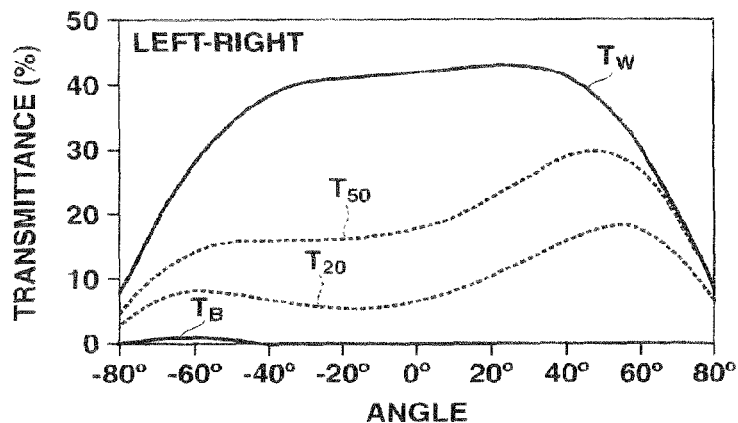
FIGS. 22A to 22D are viewing angle characteristic views at the time of white display $T_W$, black display $T_B$, 50% gradation (a gradation with 50% brightness of white display) display $T_{50}$, and 20% gradation (a gradation with 20% brightness of white display) display $T_{20}$ in the liquid crystal display device according to the fifth embodiment.
Figure 22B:
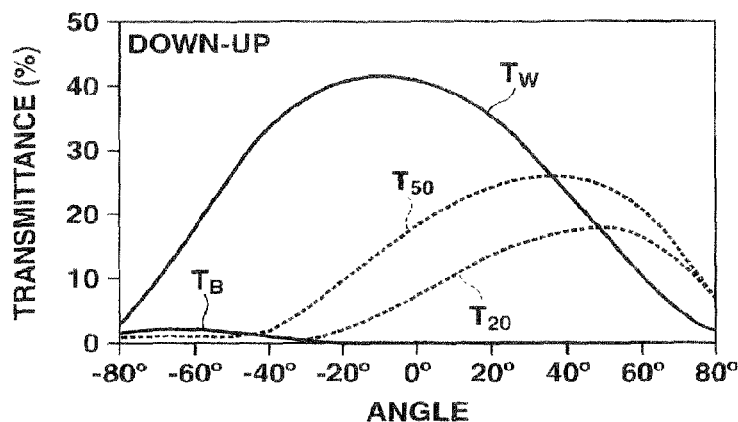
Figure 22C:
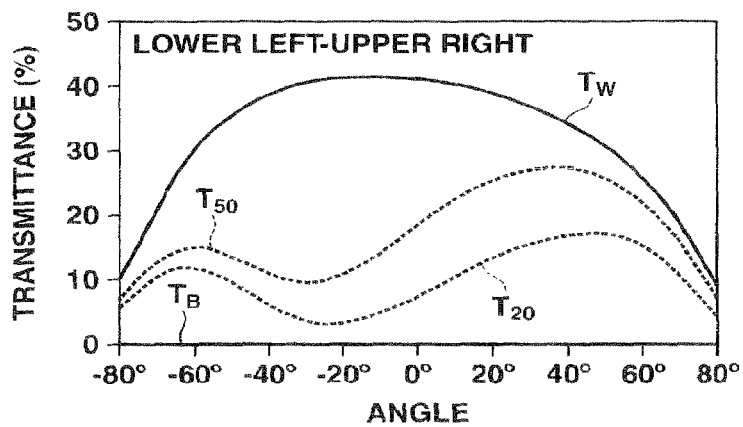
Figure 22D:
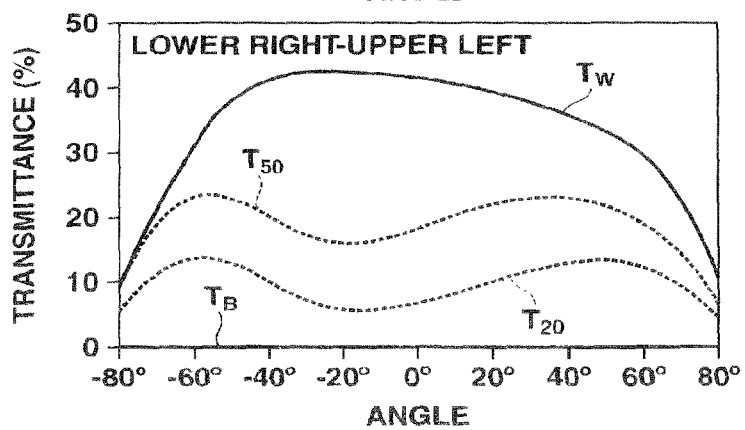

FIGS. 22A to 22D are viewing angle characteristic views at the time of white display $T_W$, black display $T_B$, 50% gradation display $T_{50}$, and 20% gradation display $T_{20}$ of the liquid crystal display device according to this embodiment. FIG. 22A shows viewing angle characteristics in a right-and-left direction of a screen, FIG. 22B shows viewing angle characteristics in an up-and-down direction of the screen, FIG. 22C shows viewing angle characteristics in a direction from the lower left to the lower right of the screen, and FIG. 22D shows viewing angle characteristics of a direction from the lower right to the upper left of the screen.

As shown in FIGS. 22A to FIG. 22D, the liquid crystal display device according to this embodiment has viewing angle characteristics that angle dependency of a transmittance in each direction, i.e., the right-and-left direction, the up-and-down direction, the direction from the lower left to the lower right, and the direction from the lower right to the upper left and inversion of an intermediate gradation does not occur in a wide angle range in each of these directions. In particular, a viewing angle is wide and contrast is high in the right-and-left direction, the direction from the lower left to the lower right, and the direction from the lower right to the upper left.

(Sixth Embodiment)

Figure 23:
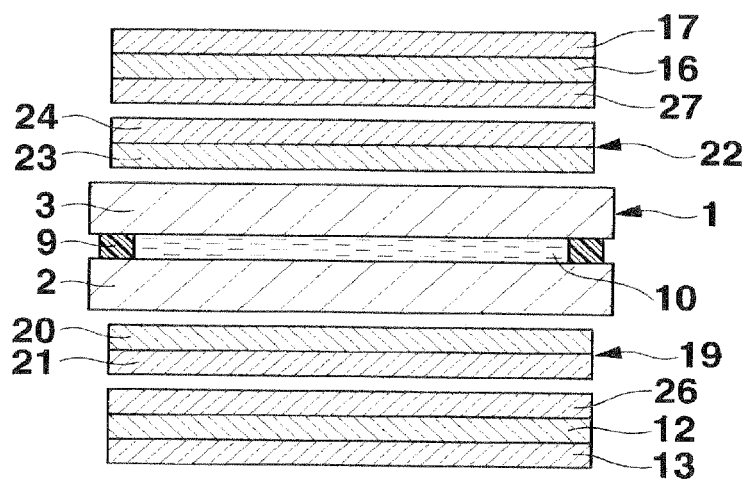
FIG. 23 is a schematic cross-sectional view of a liquid crystal display device showing a sixth embodiment according to the present invention.

FIGS. 23 to 25 show a sixth embodiment according to the present invention, and FIG. 23 is a schematic cross-sectional view of a liquid crystal display device.

The liquid crystal display device according to this embodiment has a structure where base films 13 and 17 are provided on outer surfaces alone of first and second polarizing layers 12 and 16 opposite to surfaces of the same facing a pair of substrates 2 and 3 of a liquid crystal cell 1 and first and second retardation plates 26 and 27 are respectively laminated on the surfaces of the first and second polarizing layers 12 and 16 facing the liquid crystal cell 1. A plurality of optical layers between the first polarizing layer 12 and the second polarizing layer 16 excluding a liquid crystal layer 10 include the first and second retardation plates 26 and 27, the first and second viewing angle compensating layers 20 and 23, and base films 21 and 24 of these viewing angle compensating layers 20 and 23. It is to be noted that other structures of the liquid crystal display device according to this embodiment are substantially the same as those in the second embodiment.

FIG. 24 shows aligning treatment directions 7a and 8a of first and second alignment films 7 and 8 of the liquid crystal cell 1, directions of absorption axes 12a and 16a of the first and second polarizing layers 12 and 16, optical axis directions 20a and 23a of the first and second viewing angle compensating layers 20 and 23, and directions of retardation axes 26a and 27a of the first and second retardation plates 26 and 27 in the liquid crystal display device according to this embodiment.

As shown in FIG. 24, the aligning treatment directions 7a and 8a of the first and second alignment films 7 and 8 of the liquid crystal cell 1, the directions of the absorption axes 12a and 16a of the first and second polarizing layers 12 and 16, the optical axis directions 20a and 23a of the first and second viewing angle compensating layers 20 and 23, and the directions of the retardation axes 26a and 27a of the first and second retardation plates 26 and 27 are the same as those in the first embodiment.

Further, in this embodiment, a value of $\Delta nd$ of a liquid crystal layer 10 of the liquid crystal cell 1 is set to 420 nm, values of a retardation Rthi in a thickness direction and an in-plane retardation Roi of each of the first and second viewing angle compensating layers 20 and 23 are set to Rthi=159 nm and Roi=−38 nm. Furthermore, values of a retardation Rthi in the thickness direction and an in-plane retardation Roi of each of the base films 21 and 24 of the first and second viewing angle compensating layers 20 and 23 are set to Rthi=89 nm and Roi=9 nm. Moreover, values of a retardation Rthi in the thickness direction and an in-plane retardation Roi of the first and second retardation plates 26 and 27 are set to Rthi=175 nm and Roi=35 nm. A total value of the retardation values in the thickness direction of the plurality of optical layers between the first polarizing layer 12 and the second polarizing layer 16 excluding the liquid crystal layer 10 and a retardation value in a liquid crystal layer thickness direction of the liquid crystal layer 10 is set to fall within the range of 0±80 nm in this manner.

In the liquid crystal display device according to this embodiment, the base films 13 and 17 are provided on the outer surfaces alone of the first and second polarizing layers 12 and 16, and the first and second retardation plates 26 and 27 are laminated on the surfaces of the first and second polarizing layers 12 and 16 facing the liquid crystal cell 1. Thus, the base films 21 and 24 of the first and second viewing angle compensating layers 20 and 23 alone are determined as the base films having the retardations in the thickness direction among the plurality of optical layers between the first polarizing layer 12 and the second polarizing layer 16. Since the number of base films having the retardations in the thickness direction is reduced in this manner, the angle dependency of a transmittance is further effectively improved.

Figure 25A:
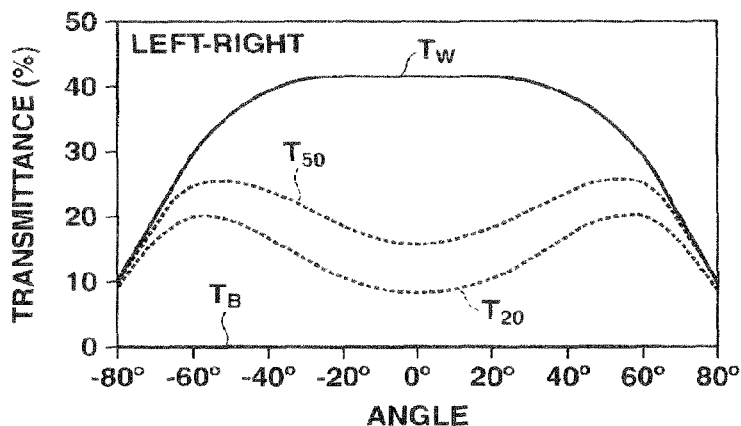
FIGS. 25A to 25D are viewing angle characteristic views at the time of white display $T_W$, black display $T_B$, 50% gradation (a gradation with 50% brightness of white display) display $T_{50}$, and 20% gradation (a gradation with 20% brightness of white display) display $T_{20}$ in the liquid crystal display device according to the sixth embodiment.
Figure 25B:
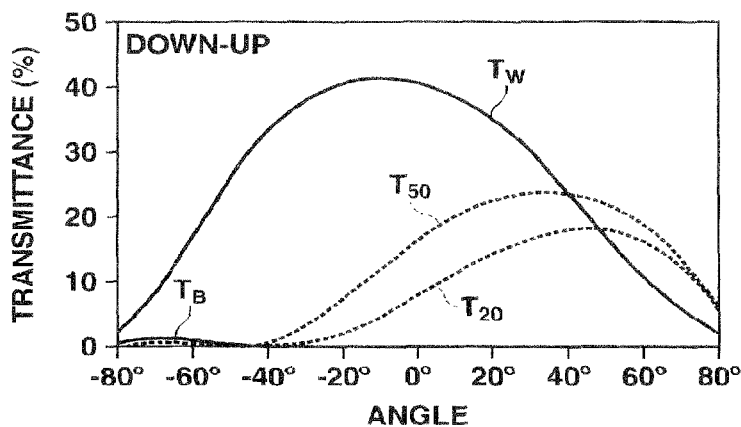
Figure 25C:
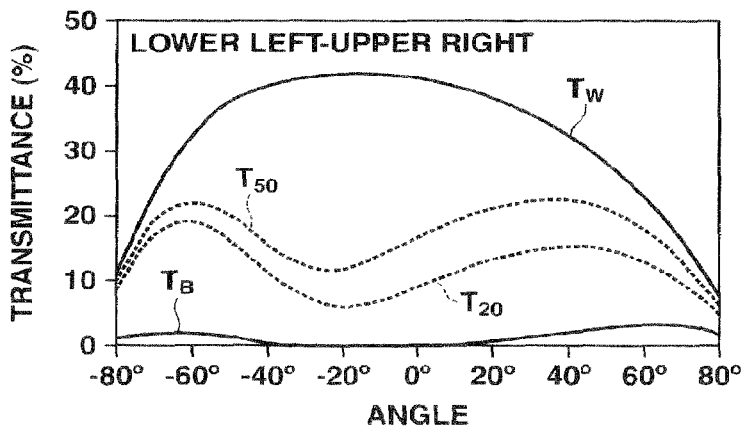
Figure 25D:
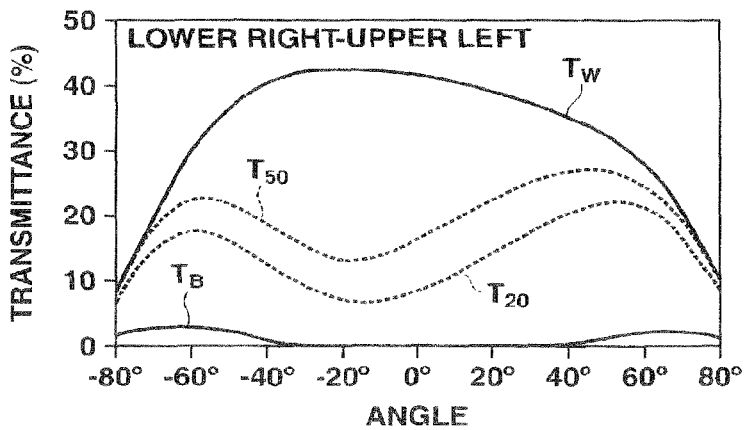

FIGS. 25A to 25D are viewing angle characteristic views at the time of white display $T_W$, black display $T_B$, 50% gradation display $T_{50}$, and 20% gradation display $T_{20}$ of a liquid crystal display device according to this embodiment. FIG. 25A shows viewing angle characteristics in a right-and-left direction of a screen, FIG. 25B shows viewing angle characteristics in an up-and-down direction of the screen, FIG. 25C shows viewing angle characteristics of a direction from the lower left to the lower right of the screen, and FIG. 25D shows viewing angle characteristics in a direction from the lower right to the upper left of the screen.

As shown in FIGS. 25A to 25D, the liquid crystal display device according to this embodiment has viewing angle characteristics that the angle dependency of a transmittance in each direction, i.e., the right-and-left direction, the up-and-down direction, the direction from the lower left to the lower right, and the direction from the lower right to the upper left of the screen is improved and inversion of an intermediate gradation does not occur in a wide angle range in each of these directions. In particular, a viewing angle is wide and contrast is high in the right-and-left direction, the direction from the lower left to the lower right, and the direction from the lower right to the upper left.

(Seventh Embodiment)

Figure 26:
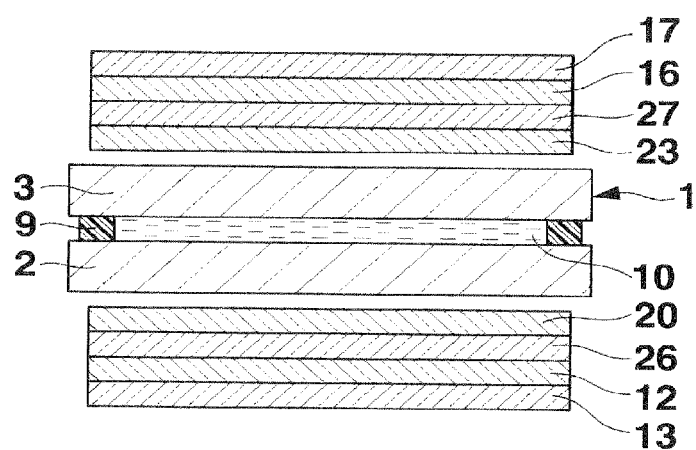
FIG. 26 is a schematic cross-sectional view of a liquid crystal display device showing a seventh embodiment according to the present invention.

FIGS. 26 to 28 show a seventh embodiment according to the present invention, and FIG. 26 is a schematic cross-sectional view of a liquid crystal display device.

The liquid crystal display device according to this embodiment has a structure where base films 13 and 17 are provided on outer surfaces alone of first and second polarizing layers 12 and 16 opposite to surfaces of the same facing a pair of substrates 2 and 3 of a liquid crystal cell 1, first and second retardation plates 26 and 27 are laminated on the surfaces of the first and second polarizing layers 12 and 16 facing the liquid crystal cell 1, and first and second viewing angle compensating layers 20 and 23 are formed on surfaces of the first and second retardation plates 26 and 27 facing the liquid crystal cell 1 in the liquid crystal display device according to the second embodiment. A plurality of optical layers between the first polarizing layer 12 and the second polarizing layer 16 excluding a liquid crystal layer 10 include the first and second retardation plates 26 and 27 and the first and second viewing angle compensating layers 20 and 23. It is to be noted that other structures of the liquid crystal display device according to this embodiment are substantially the same as those in the second embodiment.

FIG. 27 shows aligning treatment directions 7a and 8a of first and second alignment films 7 and 8 of the liquid crystal cell 1, directions of absorption axes 12a and 16a of the first and second polarizing layers 12 and 16, optical axis directions 20a and 23a of the first and second viewing angle compensating layers 20 and 23, and directions of retardation axes 26a and 27a of the first and second retardation plates 26 and 27 in the liquid crystal display device according to this embodiment.

As shown in FIG. 27, the aligning treatment directions 7a and 8a of the first and second alignment films 7 and 8 of the liquid crystal cell 1, the directions of the absorption axes 12a and 16a of the first and second polarizing layers 12 and 16, and the optical axis directions 20a and 23a of the first and second viewing angle compensating layers 20 and 23 are the same as those in the first embodiment. The first retardation plate 26 is arranged so that its retardation axis 26a sets to parallel with a direction crossing a lateral axis direction of the screen counterclockwise as seen from an observation side at an angle of substantially 100°. The second retardation plate 27 is arranged so that its retardation axis 27a sets to parallel with a direction crossing the lateral axis direction of the screen counterclockwise as seen from the observation side at an angle of substantially 10°, i.e., a direction substantially perpendicular to the retardation axis 26a of the first retardation plate 26.

Further, in this embodiment, a value of Δnd of the liquid crystal layer 10 of the liquid crystal cell 1 is set to 430 nm, and values of a retardation Rthi in a thickness direction and an in-plane retardation Roi of each of the first and second viewing angle compensating layers 20 and 23 are set to Rthi=70 nm and Roi=−47 nm. Furthermore, values of a retardation Rthi in the thickness direction and an in-plane retardation Roi of each of the first and second retardation plates 26 and 27 are set to Rthi=70 nm and Roi=48 nm. In this manner, a total value of the retardation values in the thickness direction of the plurality of optical layers between the first polarizing layer 12 and the second polarizing layer 16 excluding the liquid crystal layer 10 and a retardation value in a liquid crystal layer thickness direction of the liquid crystal layer 10 is set to fall within the range of 0±80 nm.

In the liquid crystal display device according to this embodiment, the base films 13 and 17 are provided on the outer surfaces alone of the first and second polarizing layers 12 and 16 opposite to the surfaces facing the pair of substrates 2 and 3 of the liquid crystal cell 1, the first and second retardation plates 26 and 27 are laminated on the surfaces of the first and second polarizing layers 12 and 16 facing the liquid crystal cell 1, and the first and second viewing angle compensating layers 20 and 23 are formed on the surfaces of the first and second retardation plates 26 and 27 facing the liquid crystal cell 1. Thus, base films having retardations in the thickness direction are eliminated from the plurality of optical layers between the first polarizing layer 12 and the second polarizing layer 16, and the base films 21 and 24 alone of the first and second viewing angle compensating layers 20 and 23 are adopted. As explained above, since the number of the base films having the retardations in the thickness direction is reduced, the angle dependency of a transmittance is further effectively improved.

Figure 28A:
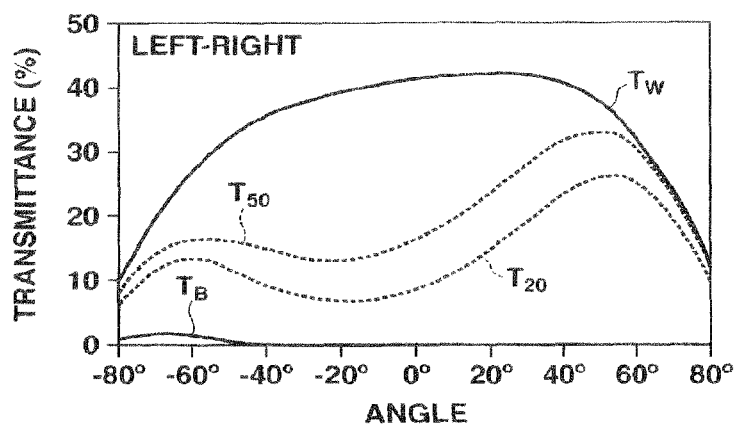
FIGS. 28A to 28D are viewing angle characteristic views at the time of white display $T_W$, black display $T_B$, 50% gradation (a gradation with 50% brightness of white display) display $T_{50}$, and 20% gradation (a gradation with 20% brightness of white display) display $T_{20}$ in the liquid crystal display device according to the seventh embodiment.
Figure 28B:
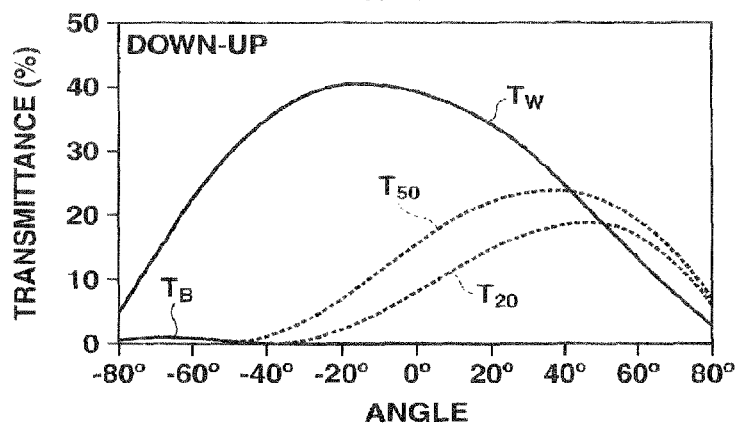
Figure 28C:
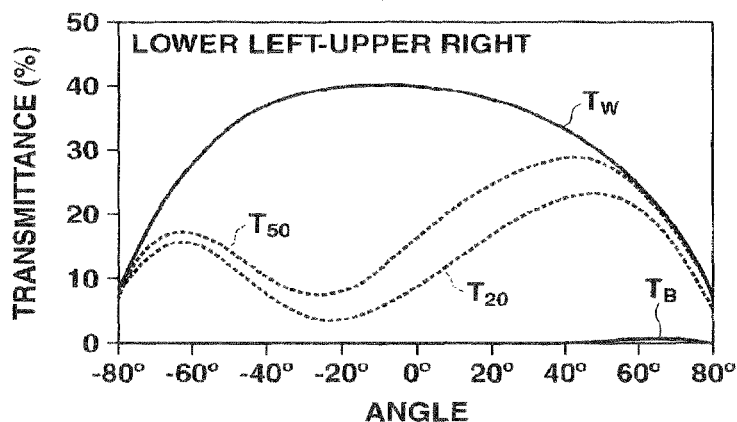
Figure 28D:
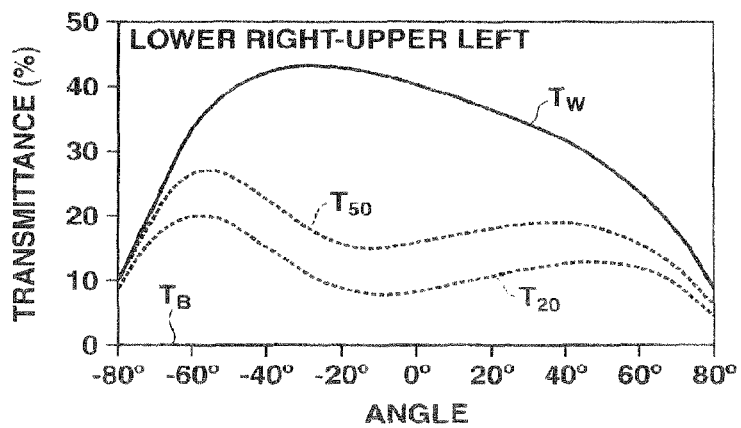

FIGS. 28A to 28D are viewing angle characteristic views at the time of white display $T_W$, black display $T_B$, 50% gradation display $T_{50}$, and 20% gradation display $T_{20}$ of the liquid crystal display device according to this embodiment. FIG. 28A shows viewing angle characteristics in a right-and-left direction of a screen, FIG. 28B shows viewing angle characteristics in an up-and-down direction of the screen, FIG. 28C shows viewing angle characteristics in a direction from the lower left to the lower right of the screen, and FIG. 28D shows viewing angle characteristics in a direction from the lower right to the upper left of the screen.

As shown in FIGS. 28A to 28D, the liquid crystal display device according to this embodiment has viewing angle characteristics that the angle dependency of a transmittance in each direction, i.e., the right-and-left direction, the up-and-down direction, the direction from the lower left to the lower right, and the direction from the lower right to the upper left of the screen is improved and inversion of the intermediate gradation does not occur in a wide angle range in each of these directions. In particular, a viewing angle is wide and contrast is high in the right-and-left direction, the direction from the lower left to the lower right, and the direction from the lower right to the upper left.

(Other Embodiments)

Although each of the first and second viewing angle compensating layers 20 and 23 according to each of the foregoing embodiments is formed of discotic liquid crystal layer in when discotic liquid crystal molecules 25 are hybrid-aligned, the first and second viewing angle compensating layers are not restricted to the discotic liquid crystal layer, and it may be formed of a liquid crystal layer in which, e.g., elongated spherical liquid crystal molecules are inclined and aligned in one direction with respect to a plane parallel to the substrate surfaces of the liquid crystal cell 1.

Furthermore, although the liquid crystal display device according to each of the foregoing embodiments is of a normally white type in which the first polarizing layer 12 and the second polarizing layer 16 are arranged so that their absorption axes 12a and 16a are substantially perpendicular to each other, the liquid crystal display device may be of a normally black type in which the first polarizing layer 12 and the second polarizing layer 16 are arranged so that their absorption axes 12a and 16a are substantially parallel to each other.

As explained above, the liquid crystal display device according to the present invention includes: a liquid crystal cell that includes a pair of substrates each having at least one electrode and an alignment film that covers this electrode being provided on each of inner surfaces facing each other, and a liquid crystal layer that is sandwiched between these substrates and includes liquid crystal molecules twist-aligned at substantially 90°; first and second polarizing plates that are arranged on both sides of the liquid crystal cell, and each of which includes a polarizing layer having a transmission axis allowing transmission of linear polarized light and an absorption axis in a direction perpendicular to the transmission axis and at least one base film that holds this polarizing layer; and first and second viewing angle compensating layers that are respectively arranged between the liquid crystal cell and the first and second polarizing plates, and each of which has a phase difference within a plane parallel to the substrate surfaces of the liquid crystal cell and a phase difference within a plane perpendicular to the substrate surfaces. A total value of retardations in a thickness direction, each of which is a product of a phase difference within the plane perpendicular to the substrate surfaces and a layer thickness, of a plurality of optical layers between the first and second polarizing layers, including at least the first and second viewing angle compensating layers but excluding the liquid crystal layer, is set to a value that cancels out a retardation in a liquid crystal layer thickness direction, which is a product of a phase difference within the plane perpendicular to the substrate surfaces and a liquid crystal layer thickness, of the liquid crystal layer when a voltage that is sufficiently high to raise and align the liquid crystal molecules with respect to the substrate surfaces is applied to the liquid crystal layer between the electrodes of the first and second substrates.

In this liquid crystal display device, it is preferable for the retardation in the thickness direction of each of the plurality of optical layers and the retardation in the liquid crystal layer thickness direction of the liquid crystal layer to be set so that a value obtained by adding a total value of the retardations in the thickness direction of the plurality of optical layers and the value of the retardation in the liquid crystal layer thickness direction of the liquid crystal layer falls within the range of −80 nm to +80 nm.

Furthermore, in this liquid crystal display device, it is preferable for the value of the retardation in the liquid crystal layer thickness direction of the liquid crystal layer when a voltage that is sufficiently high to raise and align the liquid crystal molecules is applied and the total value of the retardations in the thickness direction of the plurality of optical layers between the first and second polarizing layers excluding the liquid crystal layer to be set so that a difference between absolute values of these values is not greater than 80 nm and these values have a positive and a negative signs opposite to each other. In this case, it is preferable for the retardation in the liquid crystal layer thickness direction to be a value calculated by multiplying a value of a product $\Delta nd$ of an anisotropic refractive index $\Delta n$ of a liquid crystal material constituting the liquid crystal layer and a liquid crystal layer thickness d by a coefficient in the range of 0.72 to 0.89 that is selected in accordance with a pre-tilt angle of the liquid crystal molecules with respect to the substrate surfaces and a value of the voltage that is sufficiently high to raise and align the liquid crystal molecules. Moreover, in regard to each of the plurality of optical layers excluding the liquid crystal layer between the first polarizing layer and the second polarizing layer, assuming that one and the other of two directions perpendicular to each other within a plane parallel to the substrate surfaces are an X axis and a Y axis, a thickness direction perpendicular to the substrate surfaces is a Z axis, a refractive index in the X axis direction is nx, a refractive index in the Y axis direction is ny, a refractive index in the Z axis direction is nz, and a layer thickness of the optical layer is d, it is preferable for a total value of retardations in the thickness direction of the respective optical layer each of which is expressed as $\{(nx+ny)/2-nz\}\cdot d$ to be set to a value that is substantially equal to a value calculated by multiplying a value of the product $\Delta nd$ of the anisotropic refractive index $\Delta n$ of the liquid crystal material constituting the liquid crystal layer and the liquid crystal layer thickness d by a coefficient in the range of 0.72 to 0.89 selected in accordance with a pre-tilt angle of the liquid crystal molecules with respect to the substrate surfaces and a value of the voltage that is sufficiently high to raise and align the liquid crystal molecules. Additionally, it is preferable for the total value of the retardation values in the thickness direction of the respective optical layers between the first and second polarizing layers excluding the liquid crystal layer to be set substantially equal to a value calculated by multiplying the product $\Delta nd$ of the anisotropic refractive index $\Delta n$ of the liquid crystal material constituting the liquid crystal layer and the liquid crystal layer thickness d by a coefficient 0.83.

In the liquid crystal display device according to the present invention, it is preferable for a total value of in-plane retardations of the respective optical layers between the first and second polarizing layers including the liquid crystal layer to be set to the range of 350 nm to 600 nm, the in-plane retardation of each optical layer being a product of an in-plane phase difference within a plane parallel to the substrate surfaces and a layer thickness of each optical layer.

In the liquid crystal display device according to the present invention, the liquid crystal cell includes: a first substrate having at least one first electrode and a first alignment film that covers the first electrode and is subjected to an aligning treatment in a predetermined first direction being provided on one surface thereof; a second substrate that is arranged to face an electrode formation surface of the first substrate, and has at least one second electrode facing the first electrode and a second alignment film that covers the second electrode and is subjected to an aligning treatment in a second direction crossing the first direction at an angle of substantially 90° being provided on a surface facing the first substrate; and a liquid crystal layer that is twist-aligned and held at a twisted angle of substantially 90° between the first alignment film of the first substrate and the second alignment film of the second substrate. It is preferable for the first polarizing plate has a first polarizing layer to have an absorption axis in a direction crossing an aligning treatment direction of the first alignment film at an angle of substantially 45°, and for the second polarizing plate to have a second polarizing layer having an absorption axis in a direction substantially perpendicular to or substantially parallel to the absorption axis of the first polarizing layer.

In the liquid crystal display device according to the present invention, each of the first and second polarizing layers preferably includes a base film formed of a resin film that is provided on at least a surface of the polarizing layer facing the first or second substrate and has a retardation in a thickness direction, which is a product of a phase difference within a plane perpendicular to the substrate surfaces and a layer thickness. Each of the first and second viewing angle compensating layers preferably includes a base film formed of a resin film that is provided on at least one surface of the viewing angle compensating layer and has a retardation in the thickness direction, which is a product of a phase difference within a plane perpendicular to the substrate surfaces and a layer thickness. The plurality of optical layers between the first and second polarizing layers excluding the liquid crystal layer preferably include at least the base films on the surfaces of the first and second polarizing layers facing the first and second substrates, the first and second viewing angle compensating layers, and the base films of these viewing angle compensating layers.

In the liquid crystal display device according to the present invention, it is preferable that a first retardation plate is further arranged between the first polarizing layer and the first viewing angle compensating layer and a second retardation plate is further arranged between the second polarizing layer and the second viewing angle compensating layer. In this case, each of the first and second polarizing layers preferably includes a base film formed of a resin film that is provided on at least the surface of the polarizing layer facing the first or second substrate and has a retardation in the thickness direction, which is a product of a phase difference within a plane perpendicular to the substrate surfaces and a layer thickness, and the first and second viewing angle compensating layers are preferably respectively formed on plate surfaces of the first retardation plate and the second retardation plate. Furthermore, each of the first and second polarizing layers preferably includes a base film formed of a resin film arranged on an outer surface of the polarizing layer opposite to the surface facing the first or second substrate. Each of the first and second viewing angle compensating layers preferably includes a base film formed of a resin film that is provided on at least one surface of the viewing angle compensating layer and has a retardation in the thickness direction, which is a product of a phase difference in a plane perpendicular to the substrate surfaces and a layer thickness. The first and second retardation plates are preferably laminated on the surfaces of the first and second polarizing layers facing the first and second substrates, respectively. Moreover, each of the first and second polarizing layers preferably includes a base film formed of a resin film arranged on the outer surface of the polarizing layer opposite to the surface facing the first or second substrate. The first and second retardation plates are preferably laminated on the surfaces of the first and second polarizing layers facing the first and second substrates, respectively. The first and second viewing angle compensating layers are preferably formed on the plate surfaces of the first and second retardation plates, respectively. Additionally, it is preferable that an optical film is further arranged either between the first retardation plate and the first viewing angle compensating layer or between the second retardation plate and the second viewing angle compensating layer, the optical film having one refractive index nx and the other refractive index in two directions perpendicular to each other within a plane parallel to the substrate surfaces, and a refractive index nz in a thickness direction perpendicular to the substrate surfaces satisfying a relationship of $nx=ny>nz$.

The liquid crystal display device according to the present invention includes: a first substrate having at least one electrode and a first alignment film that covers the first electrode and is subjected to an aligning treatment in a predetermined first direction being provided on one surface thereof; a second substrate having at least one second electrode that faces the first electrode and a second alignment film that covers the second electrode and is subjected to an aligning treatment in a second direction that crosses the first direction at an angle of substantially 90° being provided on a surface facing the first substrate; a liquid crystal layer that is sandwiched between the first alignment film of the first substrate and the second alignment film of the second substrate and includes liquid crystal molecules twist-aligned at a twisted angle of substantially 90° between the first alignment film and the second alignment film; a first polarizing plate including a first polarizing layer that is arranged to face an outer surface opposite to an electrode formation surface of the first electrode and has an absorption axis in a direction crossing the aligning treatment direction of the first alignment film at an angle of substantially 45°, and a base film formed of a resin film that is provided on a surface of the first polarizing layer facing the first substrate and has a retardation in a thickness direction, which is a product of a phase difference within a plane perpendicular to substrate surfaces of the first and second substrates and a layer thickness; a second polarizing plate including a second polarizing layer that is arranged to face an outer surface opposite to an electrode formation surface of the second substrate and has an absorption axis in a direction substantially perpendicular to or substantially parallel to the absorption axis of the first polarizing layer, and a base film formed of a resin film that is provided on a surface of the second polarizing layer facing at least the second substrate and has a retardation in a thickness direction, which is a product of a phase difference within a plane perpendicular to the substrate surfaces and a layer thickness; and first and second viewing angle compensating plates that are respectively arranged between the first substrate and the first polarizing plate and between the second substrate and the second polarizing plate and each of which includes a viewing angle compensating layer having a phase difference within a plane parallel to the substrate surfaces and a phase difference within a plane perpendicular to the substrate surfaces, and a base film formed of a resin film that is provided on at least one surface of the viewing angle compensating layer and has a retardation in a thickness direction, which is a product of a phase difference within the plane perpendicular to the substrate surfaces and a layer thickness. A total value of the retardation values in the thickness direction, each of which is a product of a phase difference within a plane perpendicular to the substrate surfaces and a layer thickness, of a plurality of optical layers between the first polarizing layer of the first polarizing plate and the second polarizing layer of the second polarizing plate, the plurality of optical layers including the base films on the surfaces of at least the first and second polarizing plates facing the first and second substrates between the first polarizing layer of the first polarizing plate and the second polarizing layer of the second polarizing plate, the respective viewing angle compensating layers of the first and second viewing angle compensating plates, and the base films of the first and second viewing angle compensating plates but excluding the liquid crystal layer, and a retardation value in a liquid crystal layer thickness direction, which is a product of a phase difference within a plane perpendicular to the substrate surfaces and a liquid crystal layer thickness, of the liquid crystal layer when a voltage sufficiently high to raise and align the liquid crystal molecules with respect to the substrate surfaces is applied to the liquid crystal layer between the electrodes of the first and second substrates is set to the range of −80 nm to +80 nm.

In this liquid crystal display device, it is preferable for the retardation in the liquid crystal layer thickness direction to be a value calculated by multiplying a value of a product $\Delta nd$ of an anisotropic refractive index $\Delta n$ of a liquid crystal material constituting the liquid crystal layer and a liquid crystal layer thickness d by a coefficient in the range of 0.72 to 0.89 selected in accordance with a pre-tilt angle of the liquid crystal molecules with respect to the substrate surfaces and a value of the voltage sufficiently high to raise and align the liquid crystal molecules.

Furthermore, it is preferable for a total value of in-plane retardations of the plurality of optical layers between the first and second polarizing layers, including the plurality of base films, the plurality of viewing angle compensating layers, and the liquid crystal layer, to be set to the range of 350 nm to 600 nm, the in-plane retardation being a product of an in-plane phase difference within a plane parallel to the substrate surfaces and a layer thickness of each of the plurality of optical layers.

Moreover, it is preferable for a first retardation plate to be arranged between the first polarizing layer and the first viewing angle compensating layer and a second retardation plate to be arranged between the second polarizing layer an the second viewing angle compensating layer.

The liquid crystal display device according to the present invention includes: a first substrate having at least one first electrode and a first alignment film that covers the first electrode and is subjected to an aligning treatment in a predetermined first direction being provided on one surface thereof; a second substrate that is arranged to face an electrode formation surface of the first electrode and has at least one second electrode that faces the first electrode and a second alignment film that covers the second electrode and is subjected to an aligning treatment in a second direction crossing the first direction at an angle of substantially 90° being provided on a surface facing the first substrate; a liquid crystal layer that is sandwiched between the first alignment film of the first substrate and the second alignment film of the second substrate and includes liquid crystal molecules twist-aligned at a twisted angle of substantially 90° between the first alignment film and the second alignment film; a first polarizing layer that is arranged to face an outer surface opposite to the electrode formation surface of the first substrate and has an absorption axis in a direction crossing an aligning treatment direction of the first alignment film at an angle of substantially 45°; a second polarizing layer that is arranged to face an outer surface opposite to an electrode formation surface of the second substrate and has an absorption axis in a direction substantially perpendicular to or parallel to the absorption axis of the first polarizing layer; and first and second viewing angle compensating layers that are respectively arranged between the first polarizing layer of the first substrate and the second polarizing layer of the second substrate and each of which has a phase difference within a plane parallel to substrate surfaces of the first and second substrates and a phase difference within a plane perpendicular to the substrate surfaces. In regard to each of a plurality of optical layers between the first and second polarizing layers including at least the first and second viewing angle compensating layers but excluding the liquid crystal layer, assuming that one and the other of two directions perpendicular to each other within a plane parallel to the substrate surfaces are an X axis and a Y axis, a thickness direction perpendicular to the substrate surfaces is a Z axis, a refractive index in the X axis direction is nx, a refractive index in the Y axis direction is ny, a refractive index in the Z axis direction is nz, a layer thickness of the optical layer is d, a retardation in the thickness direction of each optical layer represented as $\{(nx+ny)/2-nz\}\cdot d$ is Rthi, a retardation in the thickness direction obtained by adding the values of the retardations Rthi in the thickness direction of the respective optical layers is Rth, and a product of an anisotropic refractive index $\Delta n$ of a liquid crystal material constituting the liquid crystal layer and a liquid crystal layer thickness d is $\Delta nd$, the retardation Rth in the thickness direction is set to the range satisfying $-80\ nm<Rth-0.83\Delta nd<80\ nm$.

In this liquid crystal display device, in regard to the plurality of optical layers between the first polarizing layer and the second polarizing layer, assuming that an in-plane retardation of each optical layer represented as $(nx-ny)\cdot d$ is Roi, and an in-plane retardation obtained by adding values of the in-plane retardations of the respective optical layers is Ro, it is preferable for each of the in-plane retardation Ro and $\Delta nd$ of the liquid crystal layer to be set to the range satisfying $Ro+\Delta nd=350\ nm$ to 600 nm.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. A liquid crystal display device comprising:
first and second polarizing layers which are arranged so that their transmission axes are perpendicular to each other;
a liquid crystal cell arranged between the first and second polarizing layers;

a first viewing angle compensating plate arranged between the first polarizing layer and the liquid crystal cell;
a second viewing angle compensating plate arranged between the second polarizing layer and the liquid crystal cell;
a first base film which is arranged between the first polarizing layer and the first viewing angle compensating plate, and which supports the first polarizing layer; and
a second base film which is arranged between the second polarizing layer and the second viewing angle compensating plate, and which supports the second polarizing layer,
wherein the liquid crystal cell includes:
a first substrate on which a first electrode is formed;
a second substrate on which a second electrode is formed; and
a liquid crystal layer that (i) is arranged between the first electrode and the second electrode and comprises liquid crystal that has a positive dielectric anisotropy, (ii) is twist-aligned when voltage is not applied between the first and second electrodes, and (iii) causes a retardation to remain in a plane parallel to a substrate surface when a predetermined saturation voltage is applied between the first and second electrodes,
wherein the second viewing angle compensating plate includes a compensating layer comprising a hybrid-aligned discotic liquid crystal,
wherein a tilt direction of the discotic liquid crystal provided as an optical axis is set parallel to a direction of molecule orientation at the first substrate side in the liquid crystal layer when a voltage is not applied between the first and second electrodes, and
wherein a total value of retardations in a plane perpendicular to the substrate surface of optical layers arranged between the first polarizing layer and the liquid crystal cell and optical layers arranged between the second polarizing layer and the liquid crystal cell is set to a value that has an opposite sign to and the same absolute value as a retardation value in the plane perpendicular to the substrate surface of the liquid crystal layer when the saturation voltage is applied between the first and second electrodes.

2. The liquid crystal display device according to claim 1, wherein the first and second viewing angle compensating plates compensate the retardation in the plane parallel to the substrate surface that remains in the liquid crystal layer when the saturation voltage is applied.

3. The liquid crystal display device according to claim 1, wherein a bisector of a twisted angle of the twisted alignment of the liquid crystal layer when voltage is not applied between the first and second electrodes is set parallel to a transmission axis of the first polarizing layer or a transmission axis of the second polarizing layer.

4. The liquid crystal display device according to claim 1, further comprising a first retardation plate arranged between the first base film and the first viewing angle compensating plate.

5. The liquid crystal display device according to claim 4, further comprising a second retardation plate arranged between the second base film and the second viewing angle compensating plate.

6. The liquid crystal display device according to claim 1, wherein the liquid crystal layer has a pre-tilt angle.

7. A liquid crystal display device comprising:
first and second polarizing layers which are arranged so that their transmission axes are perpendicular to each other;
a liquid crystal cell arranged between the first and second polarizing layers;
a first viewing angle compensating plate arranged between the first polarizing layer and the liquid crystal cell;
a second viewing angle compensating plate arranged between the second polarizing layer and the liquid crystal cell;
a first base film which is arranged between the first polarizing layer and the first viewing angle compensating plate, and which supports the first polarizing layer; and
a second base film which is arranged between the second polarizing layer and the second viewing angle compensating plate, and which supports the second polarizing layer,
wherein the liquid crystal cell includes:
a first substrate on which a first electrode is formed;
a second substrate on which a second electrode is formed; and
a liquid crystal layer that (i) is arranged between the first electrode and the second electrode and comprises liquid crystal that has a positive dielectric anisotropy, (ii) is twist-aligned when voltage is not applied between the first and second electrodes, and (iii) causes a retardation to remain in a plane parallel to a substrate surface when a predetermined saturation voltage is applied between the first and second electrodes,
wherein the first viewing angle compensating plate includes a compensating layer comprising a hybrid-aligned discotic liquid crystal,
wherein a tilt direction of the discotic liquid crystal provided as an optical axis is set parallel to a direction of molecule orientation at the second substrate side in the liquid crystal layer when a voltage is not applied between the first and second electrodes, and
wherein a total value of retardations in a plane perpendicular to the substrate surface of optical layers arranged between the first polarizing layer and the liquid crystal cell and optical layers arranged between the second polarizing layer and the liquid crystal cell is set to a value that has an opposite sign to and the same absolute value as a retardation value in the plane perpendicular to the substrate surface of the liquid crystal layer when the saturation voltage is applied between the first and second electrodes.

8. The liquid crystal display device according to claim 7, wherein the first and second viewing angle compensating plates compensate the retardation in the plane parallel to the substrate surface that remains in the liquid crystal layer when the saturation voltage is applied.

9. The liquid crystal display device according to claim 7, wherein a bisector of a twisted angle of the twisted alignment of the liquid crystal layer when voltage is not applied between the first and second electrodes is set parallel to a transmission axis of the first polarizing layer or a transmission axis of the second polarizing layer.

10. The liquid crystal display device according to claim 7, further comprising a first retardation plate arranged between the first base film and the first viewing angle compensating plate.

11. The liquid crystal display device according to claim 10, further comprising a second retardation plate arranged between the second base film and the second viewing angle compensating plate.

12. A liquid crystal display device comprising:
first and second polarizing layers which are arranged so that their transmission axes are perpendicular to each other;

a liquid crystal cell arranged between the first and second polarizing layers;

a first viewing angle compensating plate arranged between the first polarizing layer and the liquid crystal cell;

a second viewing angle compensating plate arranged between the second polarizing layer and the liquid crystal cell;

a first base film which is arranged between the first polarizing layer and the first viewing angle compensating plate, and which supports the first polarizing layer; and a second base film which is arranged between the second polarizing layer and the second viewing angle compensating plate, and which supports the second polarizing layer, wherein the liquid crystal cell includes:
 a first substrate on which a first electrode is formed;
 a second substrate on which a second electrode is formed; and
 a liquid crystal layer that (i) is arranged between the first electrode and the second electrode and comprises liquid crystal that has a positive dielectric anisotropy, (ii) is twist-aligned when voltage is not applied between the first and second electrodes, and (iii) causes a retardation to remain in a plane parallel to a substrate surface when a predetermined saturation voltage is applied between the first and second electrodes, wherein the liquid crystal display device further comprises:
 a first retardation plate arranged between the first base film and the first viewing angle compensating plate; and
 a first optical film arranged between the first retardation plate and the first viewing angle compensating plate, the first optical film having a refractive index in the plane parallel to the substrate surface that is uniform in any direction and a refractive index in a substrate thickness direction that is different from the refractive index in the plane parallel to the substrate surface, and
 wherein a total value of retardations in a plane perpendicular to the substrate surface of optical layers arranged between the first polarizing layer and the liquid crystal cell and optical layers arranged between the second polarizing layer and the liquid crystal cell is set to a value that has an opposite sign to and the same absolute value as a retardation value in the plane perpendicular to the substrate surface of the liquid crystal layer when the saturation voltage is applied between the first and second electrodes.

13. The liquid crystal display device according to claim 12, wherein the first and second viewing angle compensating plates compensate the retardation in the plane parallel to the substrate surface that remains in the liquid crystal layer when the saturation voltage is applied.

14. The liquid crystal display device according to claim 12, wherein a bisector of a twisted angle of the twisted alignment of the liquid crystal layer when voltage is not applied between the first and second electrodes is set parallel to a transmission axis of the first polarizing layer or a transmission axis of the second polarizing layer.

15. The liquid crystal display device according to claim 12, further comprising a second retardation plate arranged between the second base film and the second viewing angle compensating plate.

16. The liquid crystal display device according to claim 15, further comprising a second optical film arranged between the second retardation plate and the second viewing angle compensating plate, the second optical film having a refractive index in the plane parallel to the substrate surface that is uniform in any direction and a refractive index in a substrate thickness direction that is different from the refractive index in the plane parallel to the substrate surface.

17. A liquid crystal display device comprising:
 first and second polarizing layers which are arranged so that their transmission axes are perpendicular to each other;
 a liquid crystal cell arranged between the first and second polarizing layers;
 a first viewing angle compensating plate arranged between the first polarizing layer and the liquid crystal cell;
 a second viewing angle compensating plate arranged between the second polarizing layer and the liquid crystal cell;
 a first base film which is arranged between the first polarizing layer and the first viewing angle compensating plate, and which supports the first polarizing layer; and
 a second base film which is arranged between the second polarizing layer and the second viewing angle compensating plate, and which supports the second polarizing layer,
 wherein the liquid crystal cell includes:
  a first substrate on which a first electrode is formed;
  a second substrate on which a second electrode is formed; and
  a liquid crystal layer that (i) is arranged between the first electrode and the second electrode and comprises liquid crystal that has a positive dielectric anisotropy, (ii) is twist-aligned when voltage is not applied between the first and second electrodes, and (iii) causes a retardation to remain in a plane parallel to a substrate surface when a predetermined saturation voltage is applied between the first and second electrodes,
 wherein the liquid crystal display device further comprises:
  a first retardation plate arranged between the first base film and the first viewing angle compensating plate;
  a second retardation plate arranged between the second base film and the second viewing angle compensating plate; and
  a first optical film arranged between the first retardation plate and the first viewing angle compensating plate, the first optical film having a refractive index in the plane parallel to the substrate surface that is uniform in any direction and a refractive index in a substrate thickness direction that is different from the refractive index in the plane parallel to the substrate surface, and
  wherein a total value of retardations in a plane perpendicular to the substrate surface of optical layers arranged between the first polarizing layer and the liquid crystal cell and optical layers arranged between the second polarizing layer and the liquid crystal cell is set to a value that has an opposite sign to and the same absolute value as a retardation value in the plane perpendicular to the substrate surface of the liquid crystal layer when the saturation voltage is applied between the first and second electrodes.

18. The liquid crystal display device according to claim 17, further comprising a second optical film arranged between the second retardation plate and the second viewing angle compensating plate, the second optical film having a refractive index in the plane parallel to the substrate surface that is uniform in any direction and a refractive index in a substrate thickness direction that is different from the refractive index in the plane parallel to the substrate surface.

19. A liquid crystal display device comprising:
first and second polarizing layers which are arranged so that their transmission axes are perpendicular to each other;
a liquid crystal cell arranged between the first and second polarizing layers;
a first viewing angle compensating plate arranged between the first polarizing layer and the liquid crystal cell;
a second viewing angle compensating plate arranged between the second polarizing layer and the liquid crystal cell;
a first base film which is arranged between the first polarizing layer and the first viewing angle compensating plate, and which supports the first polarizing layer; and
a second base film which is arranged between the second polarizing layer and the second viewing angle compensating plate, and which supports the second polarizing layer,
wherein the liquid crystal cell includes:
  a first substrate on which a first electrode is formed;
  a second substrate on which a second electrode is formed; and
  a liquid crystal layer that (i) is arranged between the first electrode and the second electrode and comprises liquid crystal that has a positive dielectric anisotropy, (ii) is twist-aligned when voltage is not applied between the first and second electrodes, and (iii) causes a retardation to remain in a plane parallel to a substrate surface when a predetermined saturation voltage is applied between the first and second electrodes,
wherein the liquid crystal cell includes:
  a pixel on which a color filter of a red component is formed;
  a pixel on which a color filter of a green component is formed; and
  a pixel on which a color filter of a blue component is formed,
  wherein a thickness of the liquid crystal layer is different among each of the pixels, and
    wherein a total value of retardations in a plane perpendicular to the substrate surface of optical layers arranged between the first polarizing layer and the liquid crystal cell and optical layers arranged between the second polarizing layer and the liquid crystal cell is set to a value that has an opposite sign to and the same absolute value as a retardation value in the plane perpendicular to the substrate surface of the liquid crystal layer when the saturation voltage is applied between the first and second electrodes.

20. The liquid crystal display device according to claim 19, wherein $\Delta nd$ of the liquid crystal layer at each of the pixels is equal at $\lambda/2$, where $\lambda$ is a wavelength of a color component corresponding to each of the pixels.

21. The liquid crystal display device according to claim 19, wherein the liquid crystal layer is twist-aligned clockwise with respect to a direction in which light proceeds.

22. A liquid crystal display device comprising:
first and second polarizing layers which are arranged so that their transmission axes are perpendicular to each other;
a liquid crystal cell arranged between the first and second polarizing layers;
a first viewing angle compensating plate arranged between the first polarizing layer and the liquid crystal cell;
a second viewing angle compensating plate arranged between the second polarizing layer and the liquid crystal cell;
a first base film which is arranged between the first polarizing layer and the first viewing angle compensating plate, and which supports the first polarizing layer; and
a second base film which is arranged between the second polarizing layer and the second viewing angle compensating plate, and which supports the second polarizing layer,
wherein the liquid crystal cell includes:
  a first substrate on which a first electrode is formed;
  a second substrate on which a second electrode is formed; and
  a liquid crystal layer that (i) is arranged between the first electrode and the second electrode and comprises liquid crystal that has a positive dielectric anisotropy, (ii) is twist-aligned when voltage is not applied between the first and second electrodes, and (iii) causes a retardation to remain in a plane parallel to a substrate surface when a predetermined saturation voltage is applied between the first and second electrodes,
wherein the first and second base films are formed of triacetylcellulose, and
wherein a total value of retardations in a plane perpendicular to the substrate surface of optical layers arranged between the first polarizing layer and the liquid crystal cell and optical layers arranged between the second polarizing layer and the liquid crystal cell is set to a value that has an opposite sign to and the same absolute value as a retardation value in the plane perpendicular to the substrate surface of the liquid crystal layer when the saturation voltage is applied between the first and second electrodes.

23. A liquid crystal display device comprising:
first and second polarizing layers which are arranged so that their transmission axes are perpendicular to each other;
a liquid crystal cell arranged between the first and second polarizing layers;
a first viewing angle compensating plate arranged between the first polarizing layer and the liquid crystal cell;
a second viewing angle compensating plate arranged between the second polarizing layer and the liquid crystal cell;
a first base film which is arranged between the first polarizing layer and the first viewing angle compensating plate, and which supports the first polarizing layer; and
a second base film which is arranged between the second polarizing layer and the second viewing angle compensating plate, and which supports the second polarizing layer,
wherein the liquid crystal cell includes:
  a first substrate on which a first electrode is formed;
  a second substrate on which a second electrode is formed; and
  a liquid crystal layer that (i) is arranged between the first electrode and the second electrode and comprises liquid crystal that has a positive dielectric anisotropy, (ii) is twist-aligned when voltage is not applied between the first and second electrodes, and (iii) causes a retardation to remain in a plane parallel to a substrate surface when a predetermined saturation voltage is applied between the first and second electrodes,
wherein the first viewing angle compensating plate includes a compensating layer comprising hybrid-aligned discotic liquid crystal, and a base film formed of triacetylcellulose supporting the compensating layer, and wherein a total value of retardations in a plane perpendicular to the substrate surface of optical layers arranged between the first polarizing layer and the liquid crystal cell and optical layers arranged between the second polarizing layer and the liquid crystal cell is set to a value that has an opposite sign to and the same absolute value as a retardation value in the plane perpendicular to the substrate surface of the liquid crystal layer when the saturation voltage is applied between the first and second electrodes.

24. The liquid crystal display device according to claim 23, wherein the second viewing angle compensating plate includes a compensating layer comprising hybrid-aligned discotic liquid crystal, and a base film formed of triacetylcellulose supporting the compensating layer.

* * * * *